US006488465B1

(12) United States Patent
Overington

(10) Patent No.: US 6,488,465 B1
(45) Date of Patent: Dec. 3, 2002

(54) TECHNIQUE FOR NESTING ARTICLES

(76) Inventor: John D. Overington, 539 Rouge Hills Road, Scarborough, Ontario (CA), M1C 2Z9

( * ) Notice: Subject to any disclaimer, the term of this patent is extended or adjusted under 35 U.S.C. 154(b) by 0 days.

(21) Appl. No.: 09/514,377

(22) Filed: Feb. 28, 2000

Related U.S. Application Data

(62) Division of application No. 09/175,425, filed on Oct. 20, 1998, which is a continuation of application No. 08/764,990, filed on Dec. 13, 1996, now abandoned.

(51) Int. Cl.$^7$ .............................................. B65B 35/56
(52) U.S. Cl. ............................. 414/788.2; 414/788.3; 414/783; 414/802
(58) Field of Search .................. 414/788.2, 788.3, 414/783, 802; 198/374

(56) References Cited

U.S. PATENT DOCUMENTS

| | | |
|---|---|---|
| 2,919,011 A | 12/1959 | Tocher |
| 3,880,070 A | 4/1975 | Kaplan |
| 3,880,296 A * | 4/1975 | Kaplan .................... 414/788.2 |
| 3,920,132 A * | 11/1975 | Cleland et al. .......... 414/788.2 |
| 3,957,163 A | 5/1976 | Tanzler |
| 4,109,801 A | 8/1978 | Uchida et al. |
| 4,165,006 A * | 8/1979 | Brusa ....................... 414/788.2 |
| 4,184,800 A | 1/1980 | Uchida et al. |
| 4,278,377 A | 7/1981 | Elineau |
| 4,392,765 A * | 7/1983 | Barton et al. ............ 414/788.2 |
| 4,419,928 A | 12/1983 | Klusmier |
| 4,427,145 A * | 1/1984 | Harris ...................... 414/788.2 |
| 4,487,540 A | 12/1984 | Buchheit |
| 4,566,833 A * | 1/1986 | Gigante ................... 414/788.2 |
| 4,977,997 A * | 12/1990 | Takigawa et al. ........... 198/374 |
| 5,027,700 A * | 7/1991 | Tschesche ................ 414/788.3 |
| 5,456,572 A * | 10/1995 | Overington ................. 198/374 |
| 5,630,496 A * | 5/1997 | Mims ........................ 198/374 |
| 5,961,273 A * | 10/1999 | Colombo et al. ........ 414/788.3 |
| 6,048,165 A * | 4/2000 | Karhumaki .............. 414/788.2 |
| 6,109,862 A * | 8/2000 | Overington .............. 414/788.2 |

FOREIGN PATENT DOCUMENTS

| | | | | |
|---|---|---|---|---|
| DD | 233109 A1 | 2/1986 | | |
| DD | 233109 A | 2/1986 | | |
| DE | 253600 | * | 2/1983 | ............. 414/788.3 |
| JP | 54-97972 | | 8/1979 | |
| JP | 57-85729 A | | 5/1982 | |
| JP | 17019 | * | 2/1983 | ............. 414/788.3 |
| JP | 98524 | * | 4/1989 | ............. 414/788.3 |

* cited by examiner

Primary Examiner—Douglas Hess
(74) Attorney, Agent, or Firm—James E. Gastle

(57) ABSTRACT

Disclosed herein is a method of nesting a pair of elongate articles, each having a complementary nesting surface, comprising the steps of: providing an article receiving surface; delivering a first elongate article to a first ready position on the article receiving surface; the first article having a first near end portion and a first far end portion; delivering a second elongate article to the article receiving surface; the second article having a second near end portion and a second far end portion; arranging the second article so that the second near end portion lies in a second ready position adjacent the first near end portion; engaging the near end portion of one of the articles independently of the far end portion thereof; transferring the engaged near end portion relative to the other of the near end portions to initiate nesting thereof; and manipulating at least one of the articles downstream of the first and second near end portions, to allow the nesting of the articles to continue beyond the first and second near end portions.

30 Claims, 24 Drawing Sheets

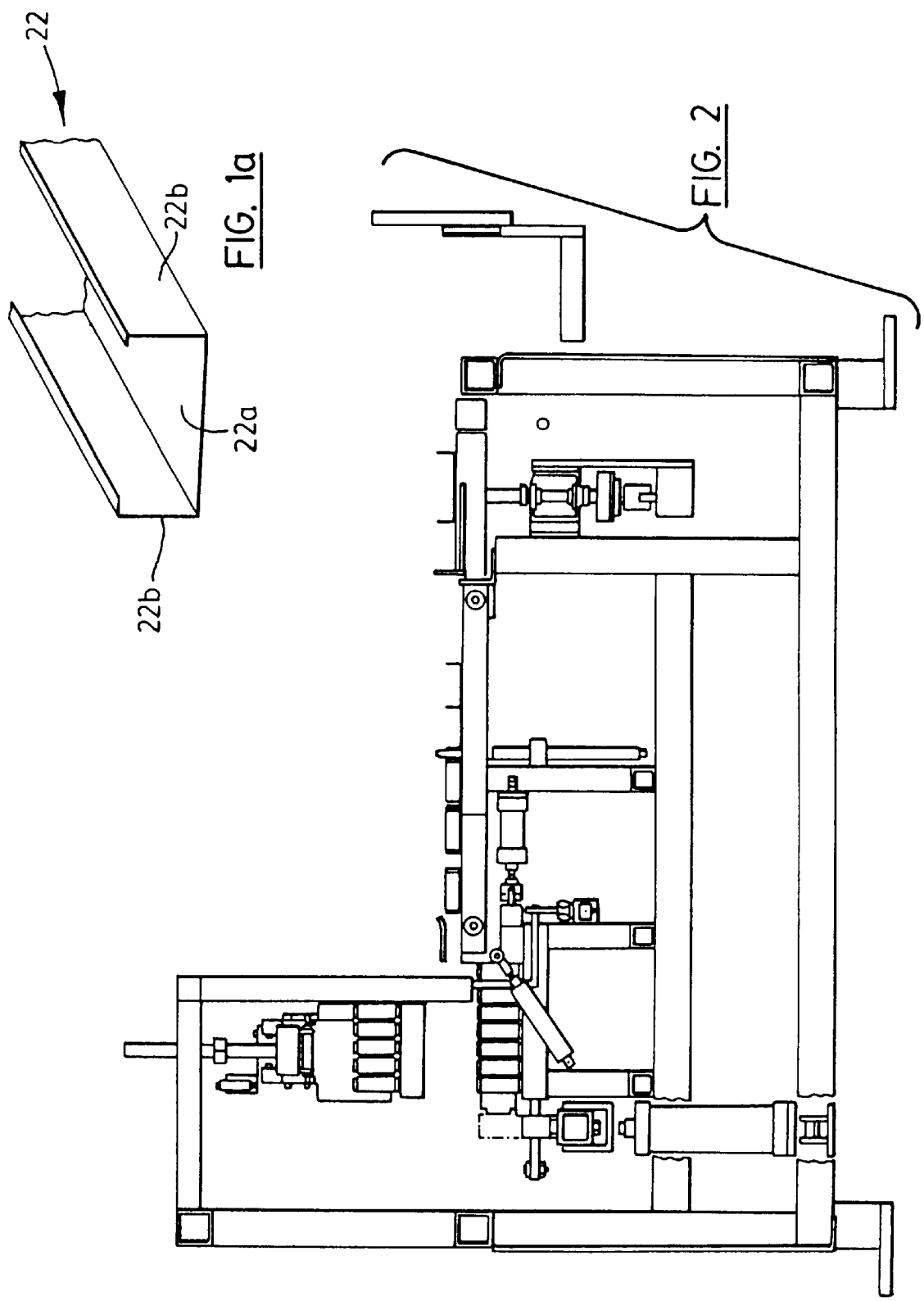

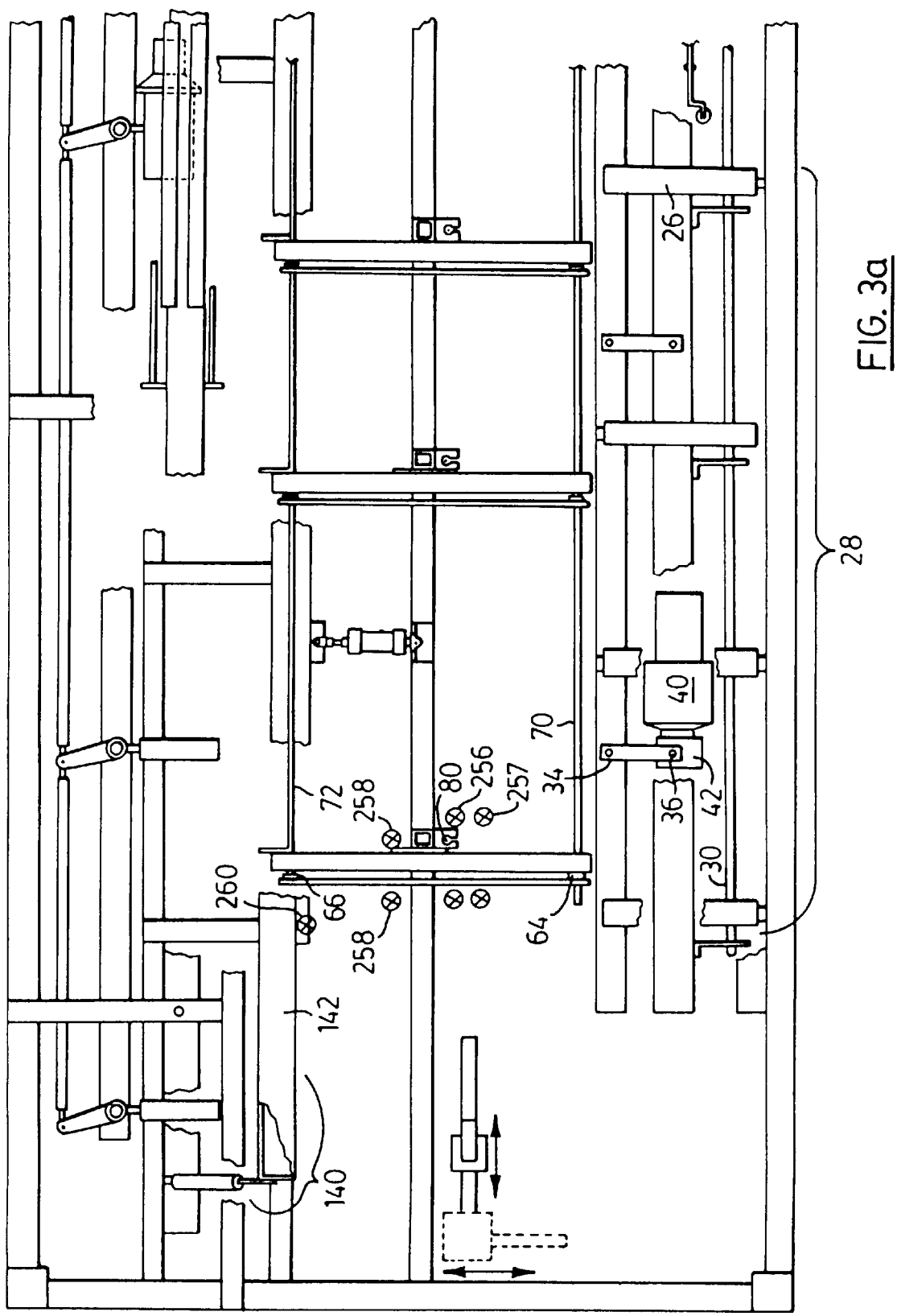

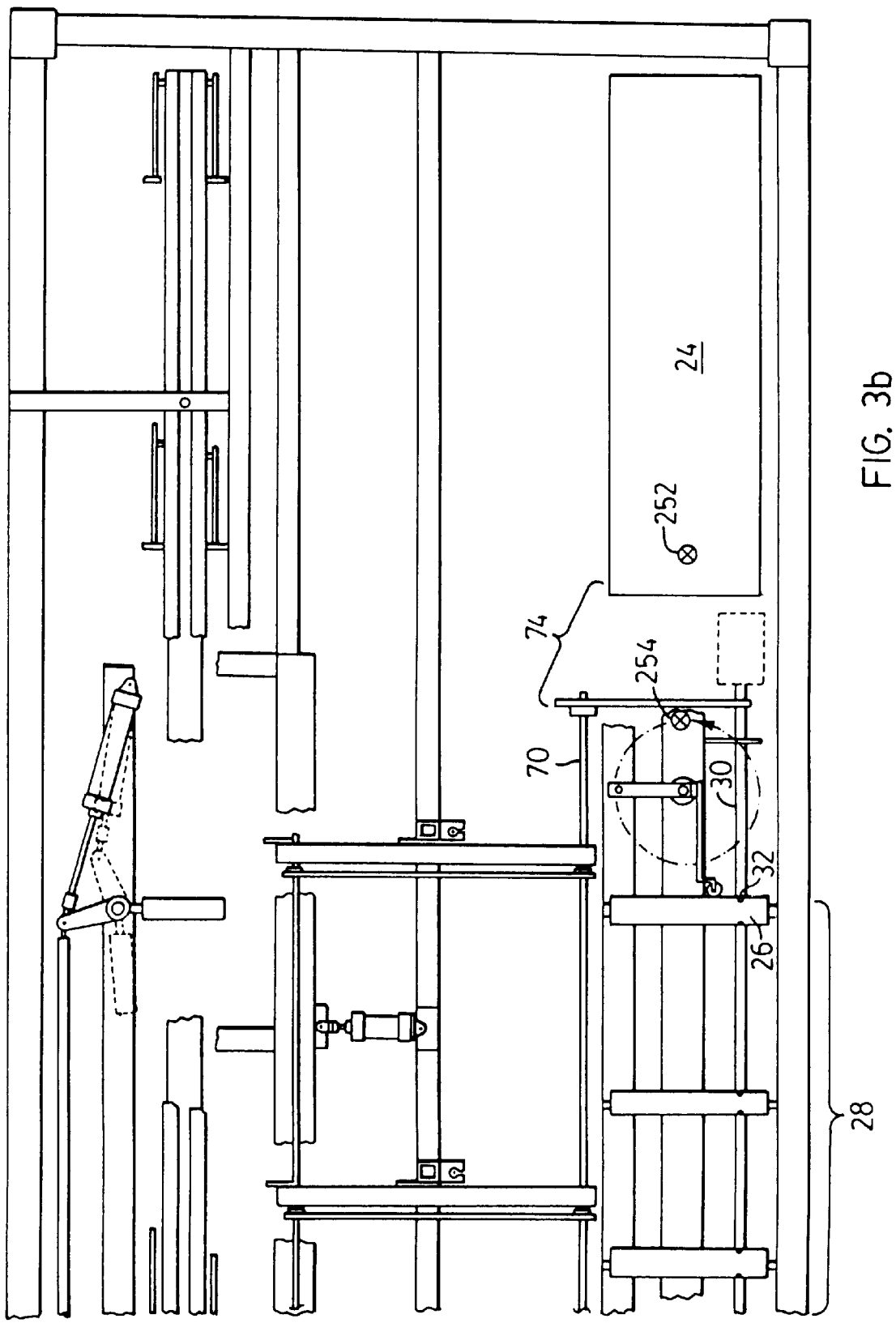

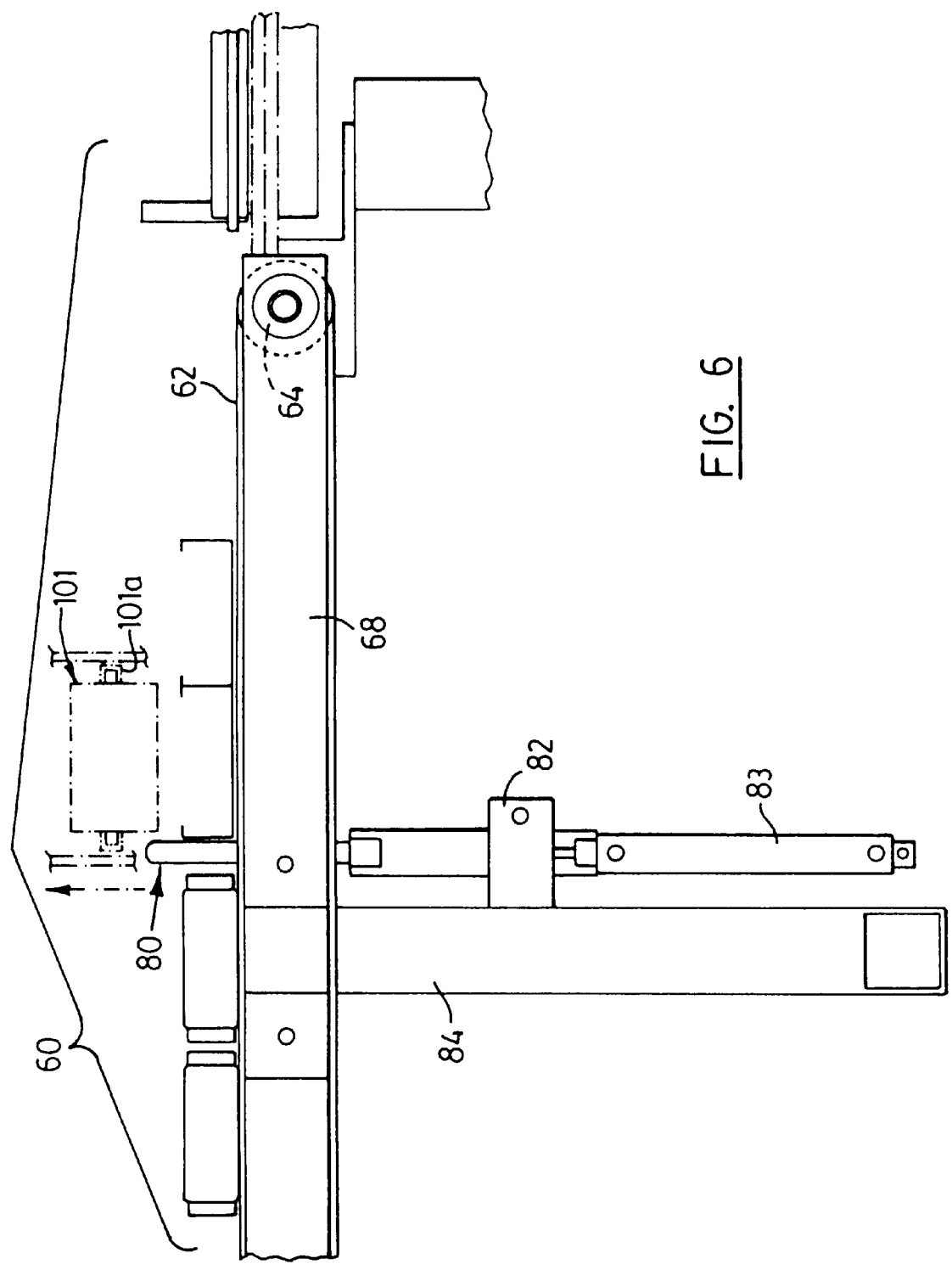

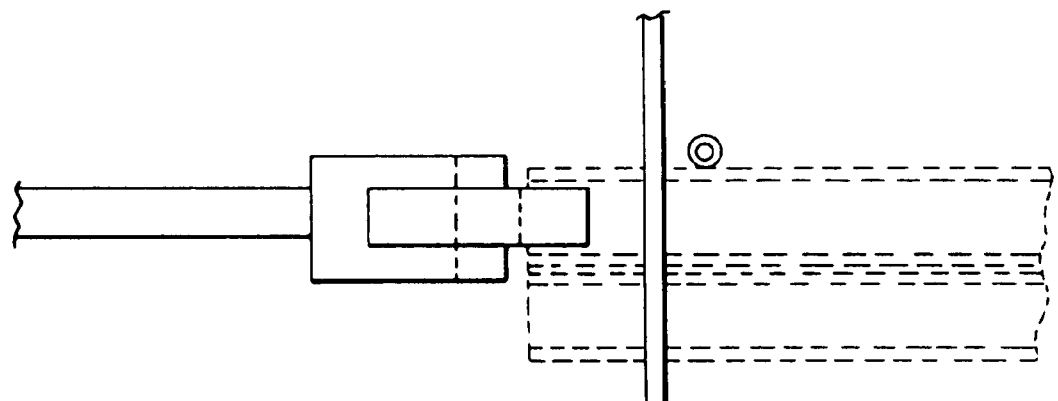
FIG. 9a
9b ↑
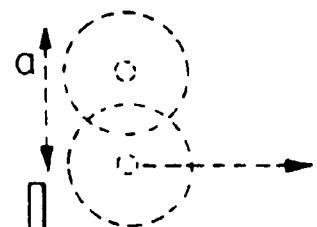
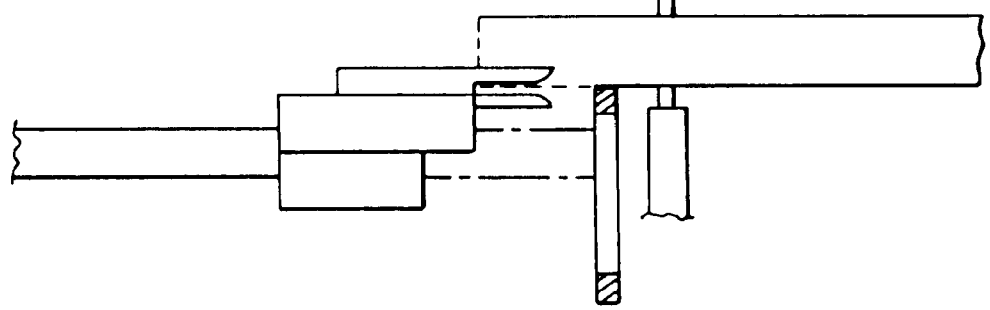
FIG. 9b

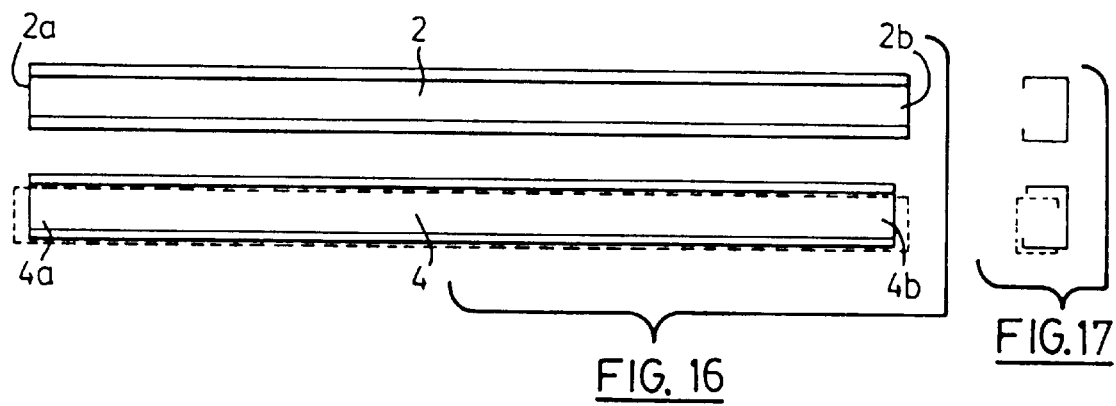
FIG. 16
FIG. 17
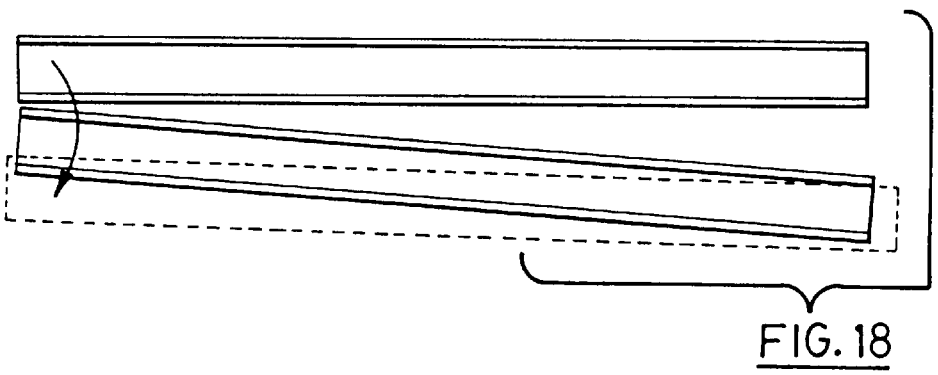
FIG. 18
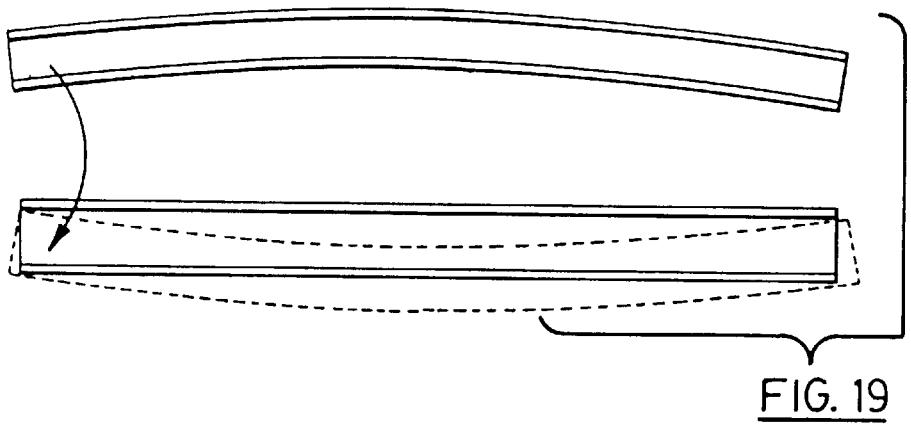
FIG. 19

TECHNIQUE FOR NESTING ARTICLES

REFERENCE TO CO-PENDING APPLICATION

This application is a Div of Ser. No. 09/175,425 filed Oct. 20, 1998, which is a con of Ser. No. 08/764,990 filed Dec. 13, 1996 abandoned.

BACKGROUND OF THE INVENTION

1. Field of the Invention

The present invention relates to techniques for nesting articles.

2. Description of the Related Art

Nesting devices have been used successfully to reduce the amount of manual labour required to fabricate a variety of articles. Channel members are especially labour intensive since one must be nested into another before they can be stacked efficiently. A common type of channel member is a wall stud which in recent years has seen widespread use in the walls of modem buildings. The wall stud fabricating industry is heavily labour intensive and the risk of repetitive strain injury claims is high, in part due to the need to invert, nest and stack the wall studs. There remains a need for an automatic nesting device that will reduce the labour required for handling channel members. An example of such nesting machines is U.S. Pat. No. 5,456,572 to OVERINGTON which is incorporated herein by reference. The device herein makes use of a pair of paddles to rotate each of a pair of channel members into a vertical position and at the same time cause them to be nested together. Though satisfactory for its intended purpose, this technique requires a relatively complicated structure and will not accommodate certain dimensional variations between channel members.

It is an object of the present invention to provide an improved technique for nesting articles.

SUMMARY OF THE INVENTION

Briefly stated, the invention involves a method of nesting a pair of elongate articles, each having a complementary nesting surface, comprising the steps of:

providing an article receiving surface;

delivering a first elongate article to a first ready position on the article receiving surface; the first article having a first near end portion and a first far end portion;

delivering a second elongate article onto the article receiving surface; the second article having a second near end portion and a second far end portion;

arranging the second article so that the second near end portion lies in a second ready position adjacent the first near end portion;

engaging the near end portion of one of the articles independently of the far end portion thereof;

transferring the engaged near end portion relative to the other of the near end portions to initiate nesting thereof; and manipulating at least one of the articles downstream of the first and second near end portions, to allow the nesting of the articles to continue beyond the first and second near end portions.

In another aspect of the present invention, there is provided a device for nesting a first article and a second article, each having a nesting surface and a number of formations extending outwardly therefrom, the first article having a first near end portion and a first far end portion and the second article having a second near end portion and a second far end portion, comprising:

an article receiving surface;

locating means for locating the first article on the surface at a first ready position;

means for delivering the first and second articles to the article receiving surface with the second near end portion located at a second ready position adjacent the first near end portion;

engaging means for engaging the near end portion of one of the articles independently of the far end portion thereof;

transfer means operable with the engaging means for transferring the engaged near end portion relative to the other of the near end portions, thereby to initiate nesting of the engaged near end portion with the other near end portion; and manipulating means for manipulating at least one of the articles downstream of the first and second near end portions, to allow nesting of the articles to continue beyond the first and second near end portions.

The present technique also provides for the nesting articles of the type having a nesting surface with a number of formations thereon, comprising the steps of:

locating a first article and a second article side by side, with the nesting surfaces of the first and second articles being oriented in a common ready position, with the first article positioned between the locating means and the second article, transferring the first article about an axis of rotation from the ready position toward an inverted position;

biasing the second article toward the first article, in order to nest the formations of the second article in the ready position with the formations of the first article in the inverted position, with the formations in staggered relationship.

In still another aspect of the present invention, there is provided a device for nesting articles of the type having a nesting surface with a number of formations thereon, the device comprising:

locating means for locating a first article and a second article side by side, with the nesting surfaces of the first and second articles being oriented in a common ready position, with the first article positioned between the locating means and the second article, transfer means for transferring the first article about an axis of rotation from the ready position toward an inverted position;

biasing means operable with the transfer means for biasing the second article toward the first article, in order to nest the formations of the second article in the ready position with the formations of the first article in the inverted position, with the formations in staggered relationship.

BRIEF DESCRIPTION OF THE DRAWINGS

Several preferred embodiments of the present invention will now be described, by way of example only, with reference to the appended drawings in which:

FIG. 1a is a fragmentary perspective view of an article;

FIG. 2 is an end view the installation shown in FIG. 1;

FIG. 3a is a fragmentary top plan view of a left hand segment of the installation of FIG. 1;

FIG. 3b is a fragmentary top plan view of a right hand segment of the installation of FIG. 1;

FIG. 4a is a fragmentary side view of the left hand segment FIG. 3a;

FIG. 6 is a magnified end view of a portion of the installation as shown in FIG. 2;

FIG. 8a is a plan view of the portion illustrated in FIG. 7a;

FIG. 8b is a side view taken on arrow 8b of FIG. 8a;

FIG. 8c is a perspective assembly of one segment of the portion illustrated in FIG. 8a;

FIG. 9a is a plan view according to FIG. 8a with the portion in a different operational position;

FIG. 9b is a side view taken on arrow 9b of FIG. 9a;

FIGS. 10a to 10e are schematic views of a nesting technique utilizing the portion illustrated in FIGS. 8a and 9a;

FIG. 16 is a schematic view of one portion of a nesting arrangement according to one aspect of the present invention;

FIG. 17 is a side view of the arrangement shown in FIG. 16;

FIGS. 18 and 19 are schematic views of aspects of yet other nesting arrangements according to one aspect of the present invention;

DESCRIPTION OF THE PREFERRED EMBODIMENTS

Figure 1:
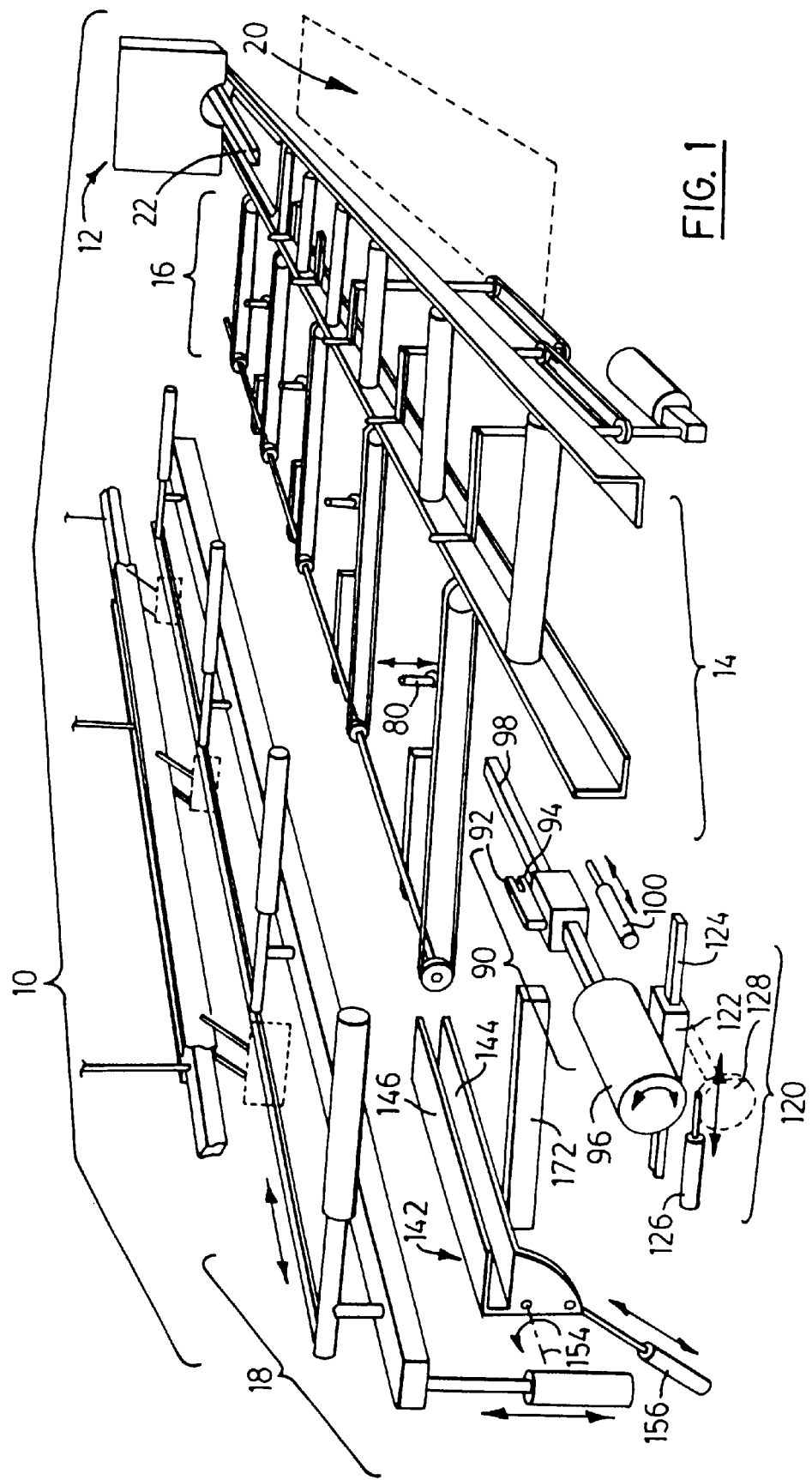
FIG. 1 is a schematic perspective view of a processing installation.

The present invention concerns the nesting of a pair of 'nestable' articles, and is particularly concerned with the ability to nest these articles while having the ability to accommodate differences The term 'nestable articles' is intended to refer to two or more articles, each of which has a complementary nesting surface. Preferably, the articles are elongate, each with a near end portion and a far end portion, and may take the shape of such things as channel members, such as those referred to in the construction trade as 'wall studs'. More preferably, the channel members have a pair of side wall portions extending outwardly from a central portion. The articles may or may not be substantially identical.

As will be explained, the technique involves:

providing an article receiving surface;

delivering a first article to a first ready position on the article receiving surface; the first article having a first near end portion and a first far end portion;

delivering a second article onto the article receiving surface; the second article having a second near end portion and a second far end portion;

arranging the second article so that the second near end portion lies in a second ready position adjacent the first near end portion;

engaging the near end portion of one of the articles independently of the far end portion thereof;

transferring the one near end portion relative to the other of the near end portions to initiate nesting thereof; and manipulating at least one of the first and second articles downstream of the first and second near end portion, to allow the nesting of the articles to continue beyond the first and second near end portions.

The present technique is based on the principle that articles with complementary nesting surfaces may be nested by moving one end portion of one article toward a nesting relationship with a corresponding end portion of the other article, and thereafter by manipulating one of the articles in a manner to allow the nesting to occur along the remainder of the articles. This technique should provide substantial reductions in complexity and increase the speed of nesting installations. Furthermore, this technique should allow for a greater variation in the parameters of the finished articles in comparison with prior nesting techniques.

FIGS. 16 through 31 are intended to illustrate certain aspects of the present technique. In some cases, the illustrations are exaggerated for demonstrative purposes only. Referring to FIGS. 16, 17, 18 and 19, the present technique may be applied to a pair of elongate articles as shown at 2, 4, each with a near end portion 2a, 4a and a far end portion 2b, 4b. One of the articles, for example article 2 is placed in a first ready position and article 4 is then delivered adjacent to article 2 with the near end portion 4a at a second position relative to the near end portion 2a. One near end portion of one article, for example 2a is then transferred to initiate nesting thereof with the near end portion 4a as shown by the dashed lines in each of the figures. In FIG. 18, article 4 is misaligned with article 2 while in FIG. 19, articles 2 and 4 are both warped. As will be described, the present technique may be capable of accommodating certain aspects of these variations.

Thus, one of the near end portions may be grasped, guided or otherwise engaged and thereafter transferred relative to the other of the near end portions to initiate nesting.

Figure 20:
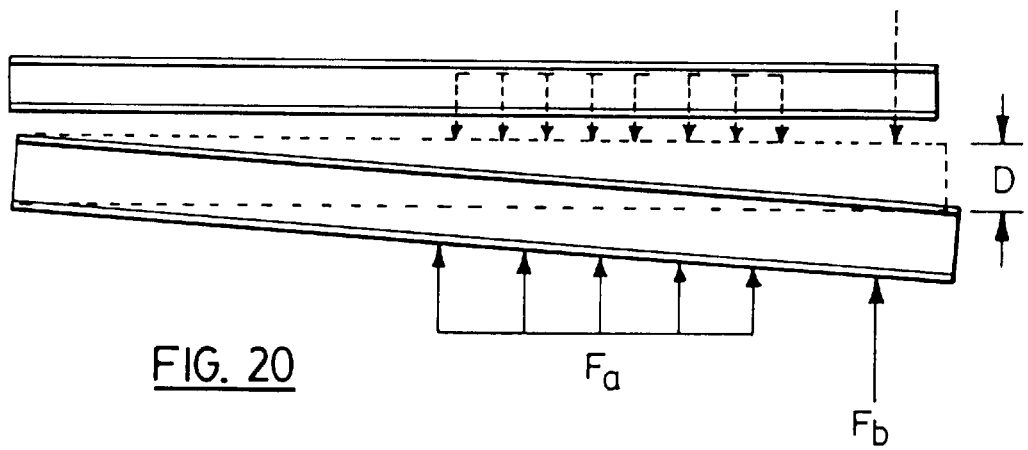
FIGS. 20 through 23 are schematic views of further nesting arrangements according to several aspects of the present invention.
Figure 21:
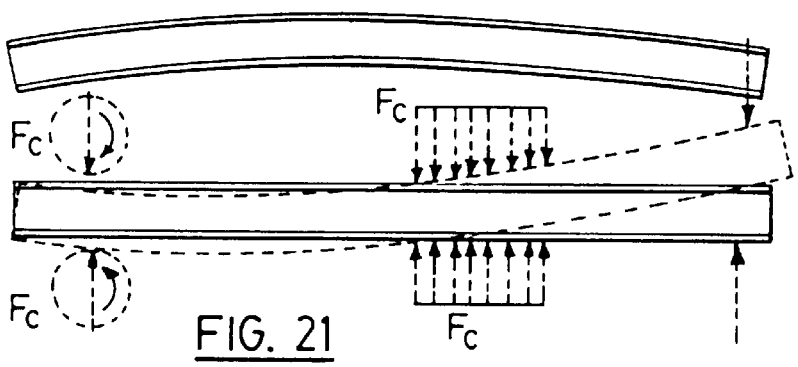

Referring to FIGS. 20 and 21, another particular aspect of the present technique is that at least one of the articles is manipulated downstream of the first and second near end portions, in such a manner as to allow the nesting of the articles to continue beyond first and second near end portions. This manipulating step may involve, for example, biasing one of the articles toward the other. This may also occur by way of a pressure force Fa exerted equally along at least a portion of the length of one or both of the articles as shown in FIG. 20, and this has the benefit of maintaining the non-transferred article in a position to nest with the approaching transferred article, such as by the use of a number of belt members to force, by friction, one article toward another. This biasing might alternatively occur by a number of force delivery means for delivering a discrete force Fb at one or more locations along the length of one or both of the articles, by way of a hydraulic ram or the like.

Preferably, the second far end portion is delivered, for example in a random fashion, to within a predetermined distance 'D' from the first far end portion as shown in FIG. 20. This distance may depend on certain parameters, such as the width and height of the two channel members and the manner in which they are to be transferred to their nested position. For example, if the articles have no significant torsional flexibility, then the distance D may be proportional to the degree of lateral play between the articles as shown by the dashed lines. If, for example, the engaged article has a significant torsional flexibility, then the distance D may also be proportional to the degree of that flexibility.

Referring to FIG. 21, this manipulating step may involve the use of a progressive biasing force Fc which is delivered to one article, starting near the corresponding near end portion and progressing along the length of the article, such as for example by way of a press means including one or more rollers 6 delivering a progressive biasing force Fc, cams, sliding blocks, or the like. The progressive biasing force may have the effect of pressing the articles together, that is pressing the first article into nesting engagement with the second article. This manipulating step thus allows the present technique to adapt to the variations in the characteristics of the articles.

The manipulating step may involve guiding one of the articles, such as the article not being transferred, into nesting engagement with the transferred article. Alternatively, the nesting step may allow one or both of the articles to flex under the biasing force to allow the nesting of the articles to continue beyond the near end portions thereof. For example, should one or more of the articles be warped or otherwise deformed, the bias may cause one article to conform to a certain degree to the other article, depending on the extent of the deformity and their resiliency.

Figure 22:
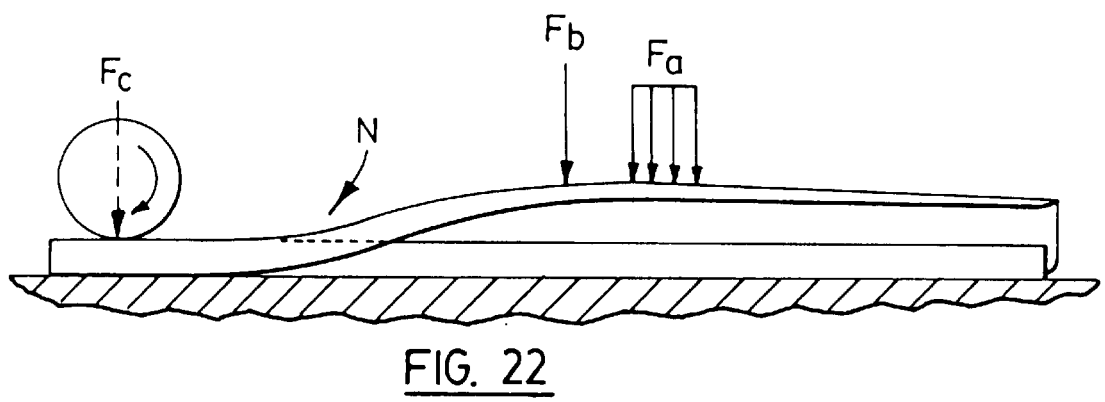
Figure 23:
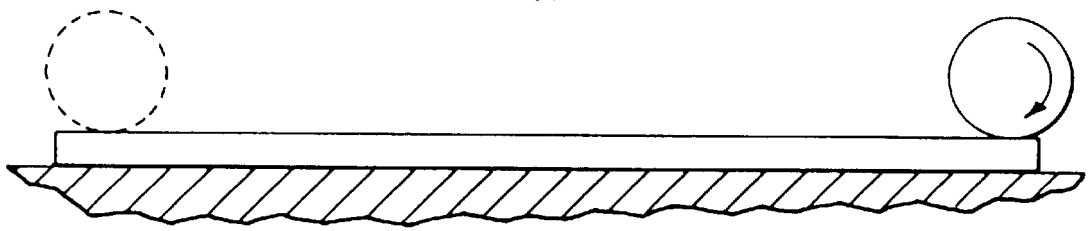

The biasing forces delivered in the manipulating step can also be vertical as shown in FIGS. 22 and 23. The location, and indeed the magnitude, of the biasing force will depend on the on the degree of nesting of the articles. For example, it may be appropriate to locate the source for the progressive force Fc in the general area of the near end portion or upstream of the nested-unnested transition region as shown at N. It may be appropriate for the discrete force Fb (or for that matter the pressure force Fa) on the other hand to be located adjacent to or downstream from the transition region N. This will depend on the characteristics of the articles and the ease with which each article can adjust during the nesting step. The article receiving surface might for example, have a very low friction coefficient which may reduce the magnitude of the bias to manipulate the articles (and vice versa).

Figure 24:
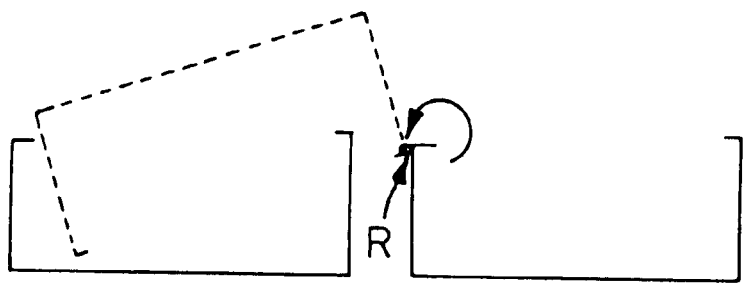
FIGS. 24 through 31 are schematic views of nesting sequences according to several aspects of the present invention.
Figure 25:
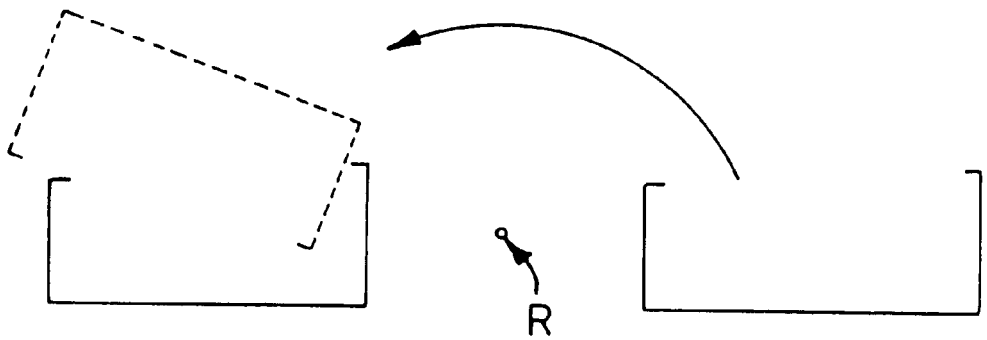
Figure 26:
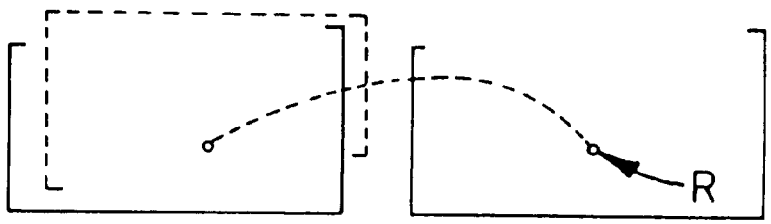

Referring to FIGS. 24, 25 and 26, the transferring step preferably includes rotating the engaged near end portion about an axis R. The axis R may be arranged to be laterally stationary as in FIGS. 24 and 25 or laterally movable as shown in FIG. 28.

Figure 27:
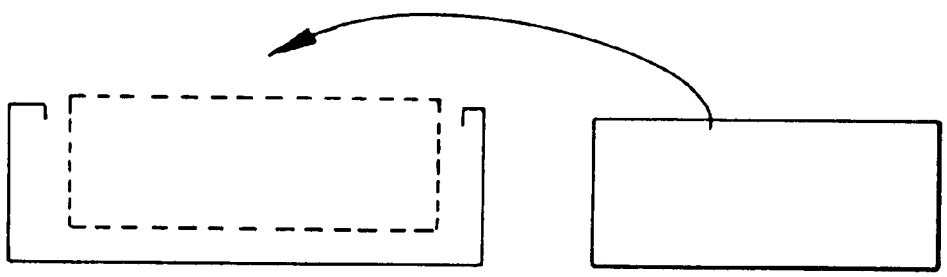

Alternatively, as shown in FIG. 27, the transferring step may involve shifting the engaged near end portion to initiate nesting without rotation, as might occur if the engaged near end portion has a nesting surface which is reversed relative to that of the other near end portion. The engaged near end portion may also have a substantially different cross section to that of the other near end portion. In this case, the engaged near end portion is rectangular but is such that its outer rectangular cross section is nonetheless complementary with the nesting surface of the other article.

Figure 29:
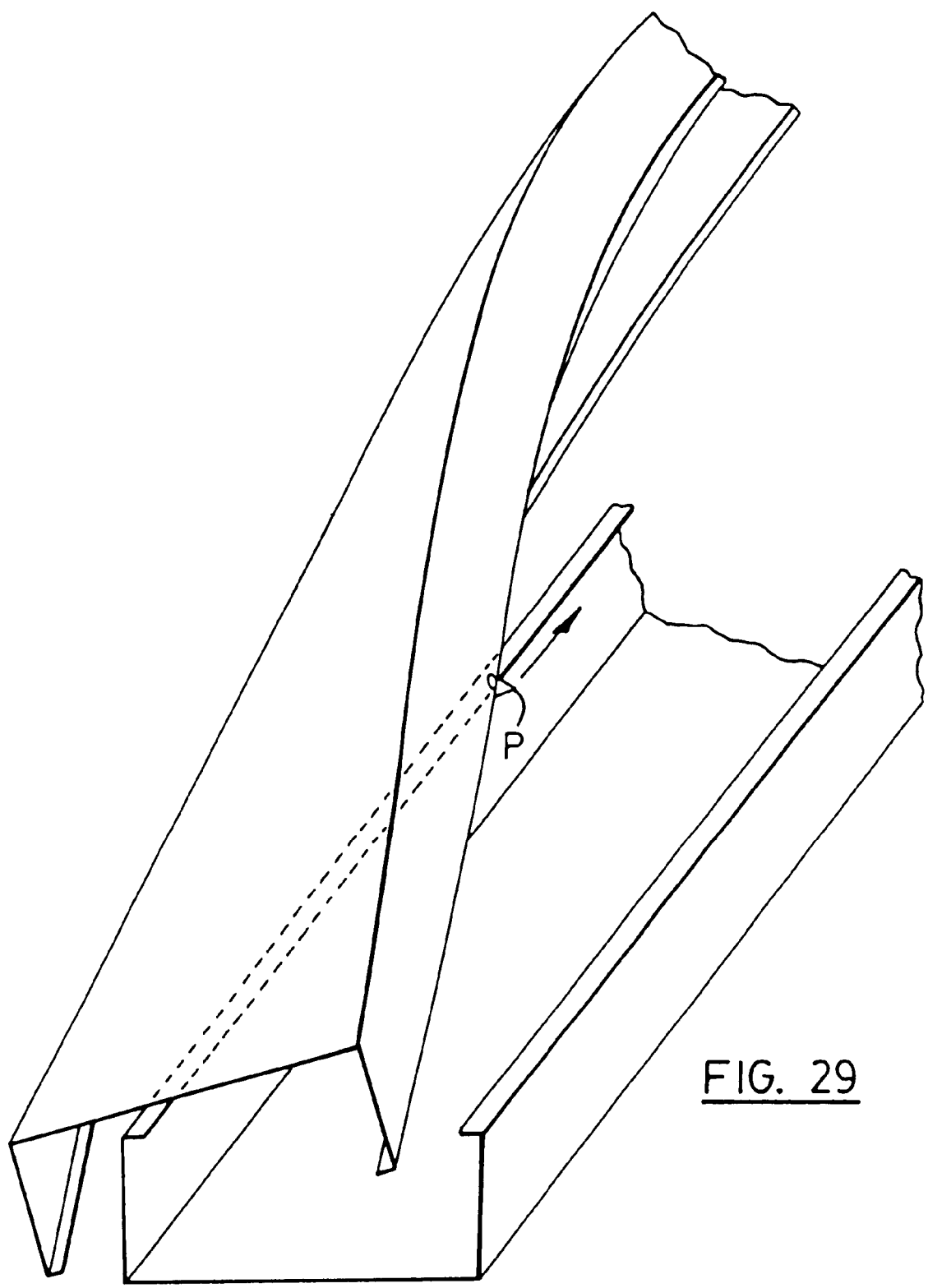
Figure 28:
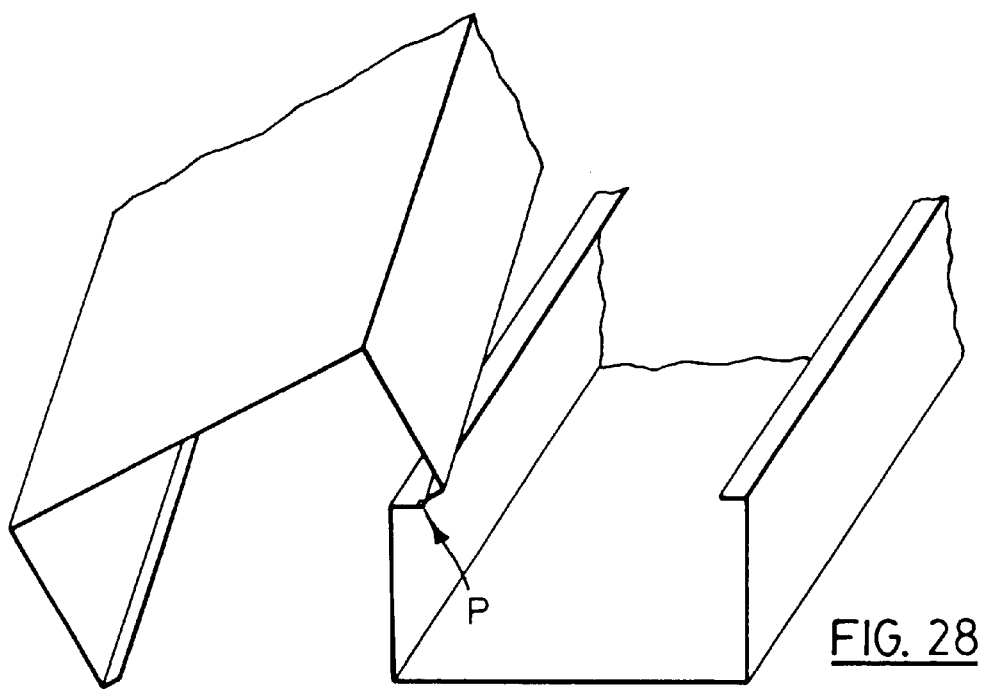
Figure 30:

Referring to FIGS. 28, 29 and 30, the transition region N may in fact include a point of contact 'P' between the articles, for example between one formation on the engaged near end portion with one adjacent formation on the other near end portion, as the nesting is initiated. In this case, the manipulating step includes the step of delivering a force to one of the articles (and preferably the engaged article) to cause the point of contact to travel toward the near end portions.

Figure 31:
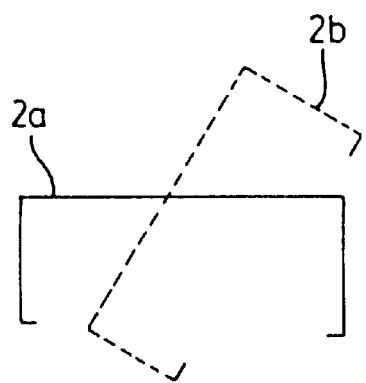

Referring to FIG. 31, the present technique is particularly suited to articles having a torsional resiliency as can commonly occur with channel members with relatively small widths, such as for example between about 1.5 and 3 inches. In this case, it is not uncommon for such channel members to have the ability to withstand twists of as much as 180 degrees without damage. In this case, the transferring step may involve the step of twisting the engaged article, thereby to initiate nesting of the near end portions while the far end portions remain unnested. The far end portion 2b of the engaged article may be at a different angular orientation than that of the engaged near end portion 2a, immediately following nesting of the latter. In this case, the engaged article will, by its resiliency, exert a force on the other nonengaged article at the point of contact P, which will contribute to the nesting of the articles beyond the near end portions.

The technique may be embodied in a nesting device, comprising an article receiving surface and locating means for locating the first article on the surface at a first ready position. The locating device may include a barrier such as a movable barrier pin, or be some other form of stop formation to temporarily interrupt the travel of the first article.

The device includes a means for delivering the first and second articles to the article receiving surface, with the first article engaging the locating means at the first ready position and the second near end portion located at a second ready position adjacent the first near end portion and engaging means for engaging the near end portion of one of the articles independently of the far end portion of the one article. This engaging means may be mechanical such as by the use of gripping or guiding members or some other means to establish a mechanical connection which can be maintained during the transferring step. The engaging means may also involve nonmechanical forms of engagement such as magnets.

A transfer means, operable with the engaging means, is provided for transferring the engaged near end portion relative to the other of the near end portions, thereby to initiate nesting of the first near end portion with the second near end portion. Also provided is a manipulating means for manipulating at least one of the articles downstream of the first and second near end portions, to allow nesting of the articles to continue beyond the first and second near end portions, as above described.

The present technique also provides for nesting articles of the type having a nesting surface with a number of formations thereon, comprising the steps of:

locating a first article and a second article side by side, with the nesting surfaces of the first and second articles being oriented in a common ready position, with the first article positioned between the locating means and the second article, transferring the first article about an axis of rotation from the ready position toward an inverted position;

biasing the second article toward the first article, in order to nest the formations of the second article in the ready position with the formations of the first article in the inverted position, with the formations in staggered relationship.

Thus, a particular feature of the present technique is that the nesting can occur without having to engage the article at both the near end portion and the far end portion or at intervals along its length. Instead, only one end portion of the article need be engaged, thereby leaving the other end to be guided into its nesting arrangement with the neighbouring far end portion, as a result of the near end being transferred to its nesting arrangement and the manipulating of at least one of the articles downstream of the near end portion.

In other words, the direct action of transferring one article from its unnested position to its nested position with the neighbouring article may occur at one end portion only. What happens downstream of the engaged near end portion depends on several factors. For example, the manipulating step may have occurred prior to the transferring step, in which case the far end portions are a properly aligned, preferably within a predetermined distance from one another as discussed above, meaning that both articles are in a nestable position. In this case, if the article itself is relatively rigid, then the transferring of the engaged near end portion will result in a substantially simultaneous transfer of all points downstream of the engaged near end portion toward the nesting position.

Alternatively, if the article itself is relatively torsionally resilient, then the transferring of the engaged near end portion may not result in a substantially simultaneous transfer of remainder of the article including the far end portion. Rather, the engaged near end portion may be in a nested relationship with the neighbouring near end portion while the far end portions are still not yet nested. In this case, the manipulating step enables one of the articles to be guided in such a fashion as to allow the nesting to continue beyond the near end portion.

One example of the present technique is illustrated in FIG. 1, in the form of a processing installation 10 including a forming station 12, a transport station 14, a nesting station 16 and a bundling station 18. Located adjacent the transport station 14 and opposite the nesting station 16 is an inspection station 20 for periodic quality assessment, as will be described. The forming station 12 is well known and forms nesting articles in the form of channel members 22. As shown in FIG. 1a, each channel member has a central wall portion 22a defining the nesting surface with formations 22b, in the form of wall members, extending therefrom. The channel members are also well known in the construction trade by the term 'wall studs'.

The forming station 12 has an exit area through which successive channel members emerge one-by-one in aligned fashion. The transport station 14 receives the channel members and transports them to the nesting station 16, wherein two channel members are nested together, to form a nested pair, and are accumulated at the bundling station 18, wherein bundles are formed of a predetermined number of nested pairs, for example five. The bundles are then dispatched to a downstream strapping station, not shown, where the bundles are strapped and otherwise prepared for shipping.

Figure 5:
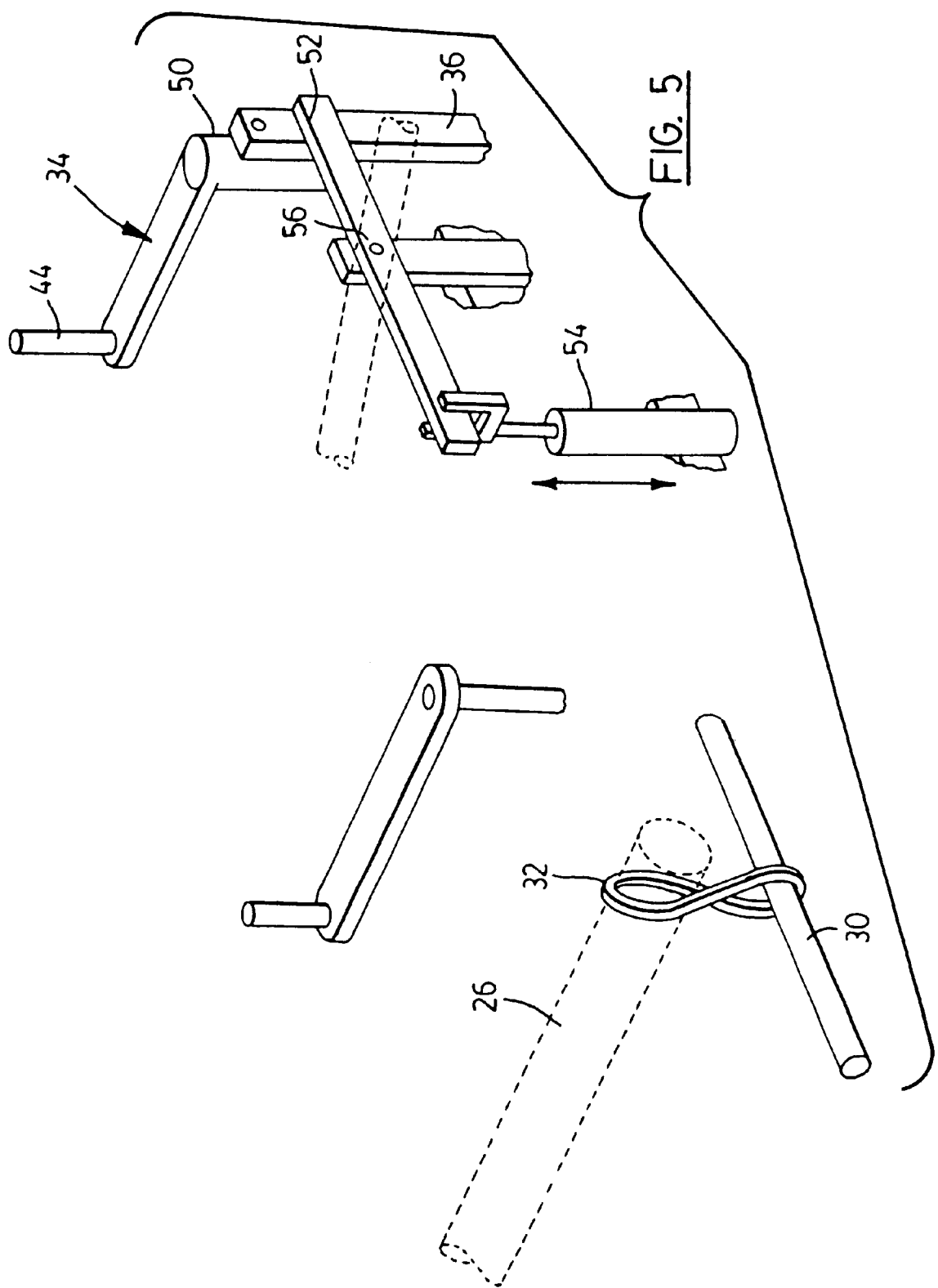
FIG. 5 is a fragmentary perspective view of a portion of the installation of FIG. 1.

Referring to FIGS. 3a, 3b and FIG. 5, the transport station 14 has an entry conveyor belt 24 and a number of drive rollers 26 forming a transport bed 28, each of which is powered by a common roller drive shaft 30 engaged with the roller by way of a flexible ring member 32. The transport station 14 transports the channel members downstream from the exit area and a number of lateral kicking arms 34 are provided to transport the channel members laterally onto the nesting station 16. The kicking arms 34 are each fixed to a corresponding vertical drive shaft 36 having a drive pulley on its lower end. One of the drive shafts 36 is coupled to the transmission of a kicking drive motor 40 and the other drive shafts 36 are joined together by timing belts with tensioners. The kicking drive motor 40 is also provided with a clutch/brake unit 42 to allow the kicking drive motor 40 to be always operating while the clutch/brake unit 42 can be engaged to activate the kicking arms 34.

Each of the kicking arms 34 has a remote end portion in the form of an upright pin 44 which projects through the plane of the transport bed 28 as defined by the upper tangents of the rollers 26. Selected ones of the kicking arms 34, in this case the third and fourth kicking arms 34, are provided with a mechanism to adjust the elevation of the pin 44. Each of the third and fourth kicking arms 34 are mounted on one of a sleeve 50 which itself is mounted on the vertical shaft for rotation therewith. An adjustment arm 52 is provided to adjust the height of the sleeve 50 and has one end pivoted to the sleeve 50 and another end engaged with a vertically oriented solenoid 54, the central portion of the arm providing a fulcrum against a frame portion.

Referring to FIGS. 1, 3a, 3b and 6, the nesting station 16 has a nesting bed 60 which forms an article receiving surface. The nesting bed 60 is defined by a number of parallel drive members in the form of belt members 62, each of which is suspended between a pair of pulleys, a first pulley 64 adjacent the transport station 14 and a second pulley 66 remote therefrom. In this case, the pulleys are mounted on respective ends of a frame member 68 and are positioned generally perpendicular to the direction of travel of the transport station 14. Collectively, the first pulleys 64 are keyed to a common first drive shaft 70 and the second pulleys 66 are freely mounted on a second shaft 72.

Referring to FIG. 3b, the first drive shaft 70 and the roller drive shaft 30 are driven by a common drive unit 74, which includes a motor and an output transmission coupled therewith.

Centrally located on the nesting bed 60 is a locating means for locating a first channel member at a first ready position. Preferably, the locating means is in the form of a number of barrier pins 80 anchored by a brace 82 which is in turn fixed to an adjacent upright frame member 84 and operated by solenoid 83, in such a manner to project into the plane of the nesting bed 60, in an operable position, thereby to form a barrier defines an entry region and an exit region on the nesting bed 60 on either side of the barrier. The barrier pins 80 are movable by way of a linear actuator between the operable position and an inoperable position below the plane of the nesting bed 60 wherein the channel members are movable from the entry region to the exit region.

In this case, the belt members and the transport station together contribute as a delivery means for delivering the first and second articles to the article receiving surface, with the first article engaging the locating means at the first ready position and the second near end portion located at a second ready position adjacent the first near end portion.

Referring to FIG. 1, the device has an engaging means for engaging the near end portion of one of the articles independently of the far end portion thereof and a transfer means operable with the engaging means for transferring the one near end portion relative to the other of the near end portions, preferably to an inverted position, thereby to initiate nesting of the first near end portion with the second near end portion. The engaging means includes a coupler unit 90 having a first lip 92 and a second lip 94, wherein a portion of the nesting article fits between the first and second lips, wherein the first lip 92 is spaced from and fixed relative to the second lip 94. The first and second lips are further arranged to receive the central wall portion therebetween in an engaged position.

The transfer means includes an elongate track member 98 with a rectangular cross section and the coupler unit 90 is slidably mounted on the track member 98 under the action of a linear actuator 100. The coupler unit 90 includes a block 102 having a pair of portions 104, 106 which are bolted together, each with a surface 104a, 106a to form an inner surface to engage the outer surface of the track member 98. The block has a remote end 108 which is arranged to be positioned adjacent the channel members and it can be seen that the lips extend beyond the remote end. The block further comprises a projection 110 on one side thereof and one lip 92 extends outwardly from the projection.

Figure 7A:
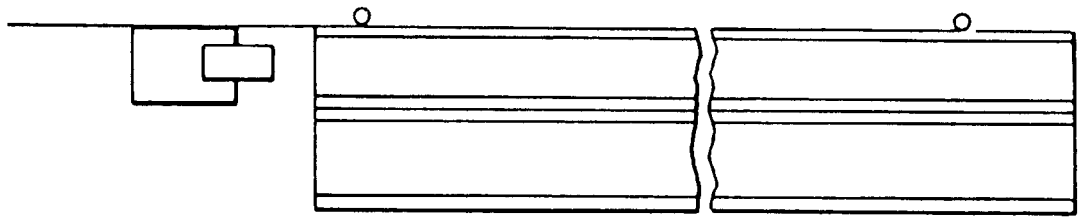
FIGS. 7a and 7b are schematic plan views of another portion of the installation of FIG. 3b in different operational positions.
Figure 7B:
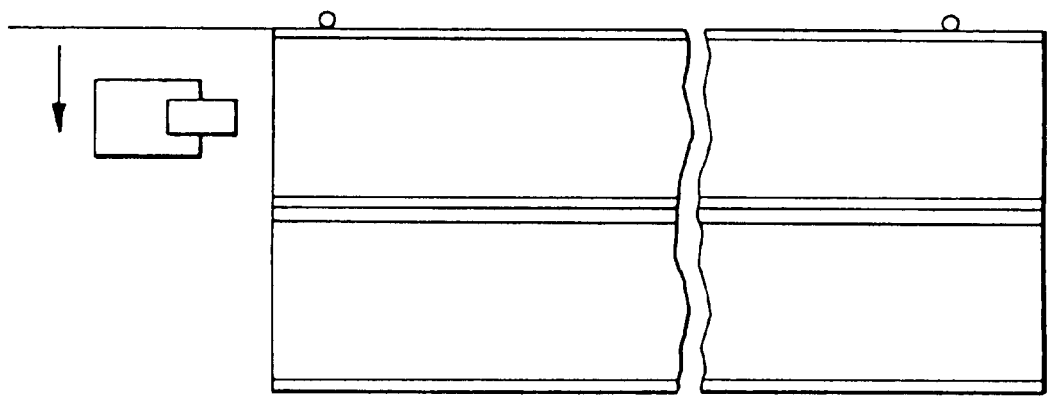

A carriage 120 is also provided for adjusting the position of the track member 98 relative to the nesting bed 60. The carriage includes a bearing assembly 122 mounting the rotator unit to a track member 124 which is generally parallel to the axis of the belt members 62. The carriage may be automatically adjusted by a linear actuator 126 or by hand by way of a crank 128. This adjustment allows the position of the first and second lips to be adjusted so that they are generally in line with a central longitudinal axis of the first channel member, to ensure proper rotation and subsequent nesting, as shown in FIGS. 7a and 7b.

Figure 8A:
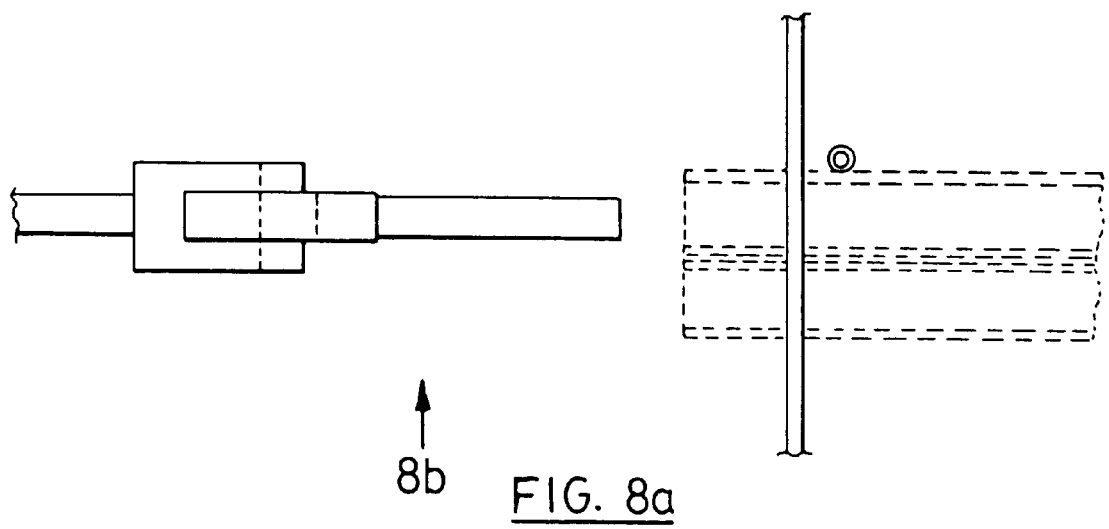
Figure 8B:
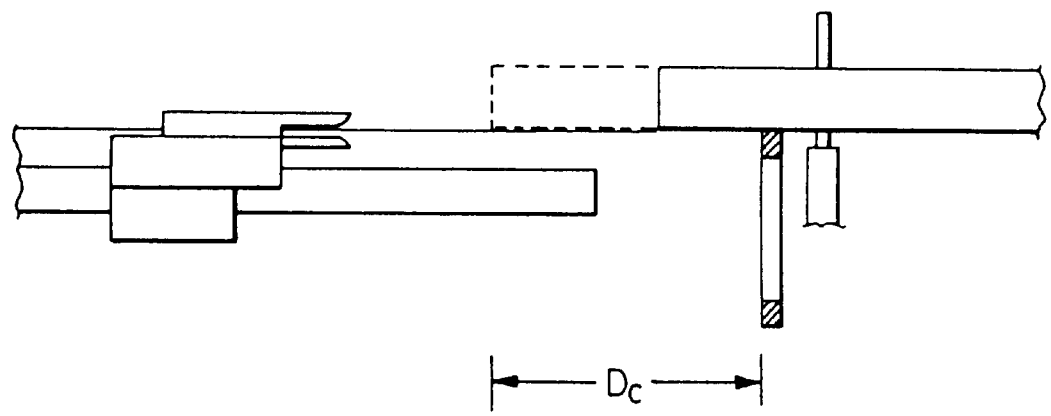
Figure 8C:
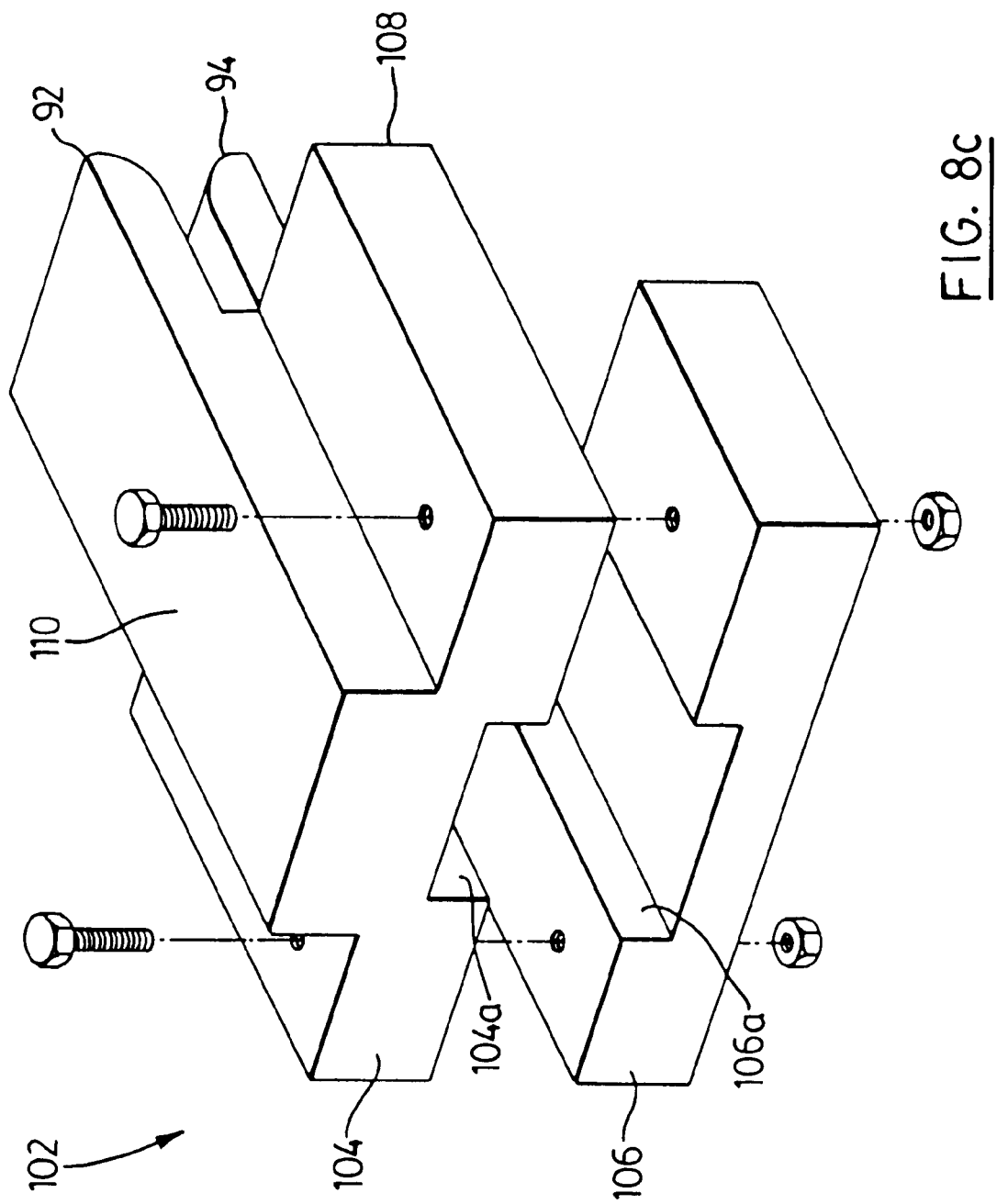

The track member 98 defines a longitudinal axis of travel and the lips are generally parallel to the axis of travel so that the lips can be displaced from an engaged position as shown in FIGS. 9a, 9b with the central portion located therebetween, and a disengaged position as shown in FIGS. 8a, 8b with the central portion spaced therefrom.

Referring once again to FIG. 8a, the position of the channel members relative to the belt member closest to the block 102 may be made adjustable depending on the dimensions of the channel members being nested. For example, increasing the distance Dc from the free edge of the channel members to the block 102 may reduce the forces being exerted on the channel members by the block 102 during nesting.

The actuating means includes rotation means, in the form of a rotator unit 96, for rotating the track member 98 about the axis of rotation in such a manner that the axis of rotation is parallel to and offset from the track member 98. The axis of rotation is aligned centrally relative to the first channel member and between an adjacent pair of the nesting formations in the engaged position. The rotator unit 96 is in the form of an indexing motor to rotate the track member 98 from its home position about the axis of rotation to an inverted position.

A manipulating means is also provided for manipulating at least one of the first and second articles downstream of the first and second near end portions, to allow nesting of the articles to continue beyond the first and second near end portions. In this case, the manipulating means is in the form of a biasing arrangement which is operable with the coupler unit 90 for biasing the second channel member toward the first channel member, in order to nest the formations of the second channel member in the ready position with the formations of the first channel member in the inverted position, with the formations in staggered relationship. In this case, both central wall portions of the first and second channel members are laying in a substantially horizontal position against the surface of the nesting bed with their wall portions extending upwardly therefrom.

The biasing arrangement is thus provided by the frictional engagement of the channel members and the belt members 62 moving toward the barrier. Transfer means is also provided in the form of a linear actuator 100 for actuating the coupler unit 90 between a disengaged position, wherein the central wall portion is separated from the lips to the engaged position.

Referring to FIG. 6, the device may also be provided with a manipulating means which is further arranged to deliver a progressive force along the length of the first and second articles. For example, the manipulating means includes press means for progressively pressing the first article into nesting engagement with the second article. As shown in FIG. 6, the press means may be provided in the form of a roller 101 which is positioned in tracks 101a to travel along the length of the first and second articles. The roller may also be equipped with a return mechanism to lift the roller to an inoperative home position during the transfer of the near end portions of the articles, as shown by position a in FIG. 9b.

Referring to FIGS. 1, 3a, 3b and 11, a nested pair delivery assembly 140 is located in the exit region of the nesting station 16 and delivers nested pairs from their horizontal orientation in the exit region to a vertical orientation in the bundling station 18. The nested pair delivery assembly 140 includes a yoke 142 which engages the nested pair and which is formed by a pair of elongate panels 144, 146, each to engage a central portion of a corresponding channel member in the nested pair. An alignment stop member 148 is provided in the yoke 142 to seat the approaching nested pair in their proper position. The elongate panels 144, 146 are fixed in parallel spaced relationship with one another by way of a web portion 150. A pivot flange 152 extends downwardly from one of the elongate panels 144,146 and is pivotally mounted for movement about a delivery axis 154. A linear actuator 156 is coupled with the pivot flange in order to move the yoke 142 from a first horizontal position as shown in solid lines in FIG. 11 and aligned with the nesting bed 60 to receive a nested pair and a second vertical position as shown in phantom in FIG. 11 to deliver the nested pair to the bundling station 18.

Together, the elongate panels 144, 146 form a first opening 158 for the passage of the nested pair, in a horizontal orientation, into the yoke 142 from the exit region of the nesting station 16 and a second opening 160 for the passage of the nested pair, in a vertical orientation, out of the yoke 142 to a yoke delivery area 170 in the bundling station 18.

The bundling station 18 includes a number of frame members defining a bundling bed 174 with a receiving area 176 adjacent to and downstream from the yoke delivery area 170. Located on one side of the yoke delivery area 170 is a series of indexing pins 178 and on the other side of the yoke delivery area 170 an indexing beam 180, the latter operable under the action of a linear actuator 181 to transfer nested pairs into the receiving area. Together, the indexing pins 178 and the indexing beam 180 receive the vertically oriented nested pair from the yoke 142. The indexing pins 178 are each pivoted to a frame member by way of a pivot plate 178a and have a lower end coupled to a linear actuator 182 so that the pins may be moved from a vertical position to a horizontal position. In the vertical position, the indexing pins 178 perform two functions, first, to form a barrier between the receiving area 176 and the yoke delivery area 170, and second, to support the right hand side of accumulated bundle of nested pairs in the receiving area 176. In the second horizontal position, the indexing pins 178 allow for the transfer of a nested pair just received in the delivery area to the receiving area 176 to join the accumulated bundle.

Figure 12:
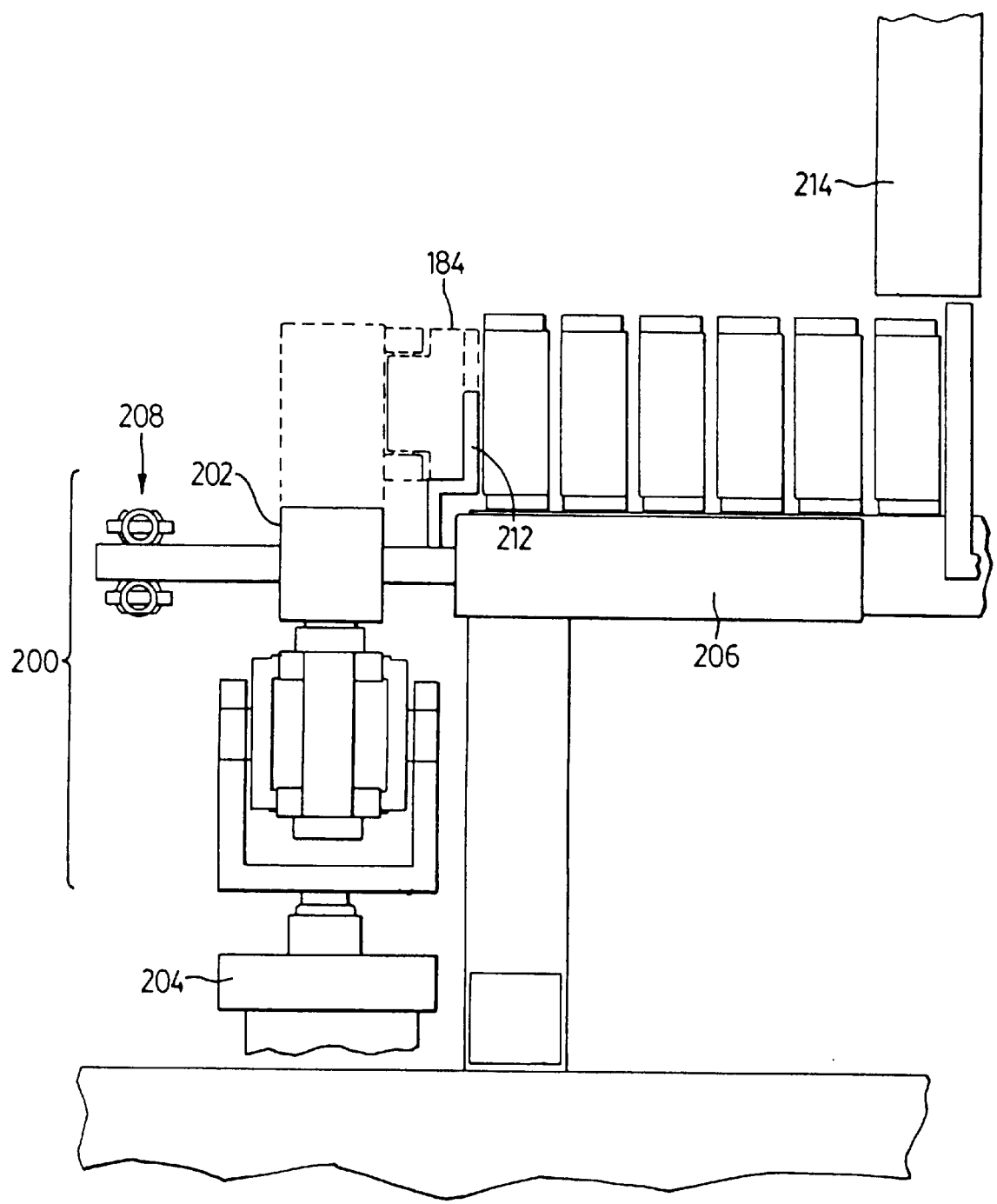
FIG. 12 is a magnified end view of still another portion of the installation as shown in FIG. 2.

Referring to FIG. 12, a series of keeper pins 184 arms are provided in, and movable across, the receiving area 176 and are biased toward the accumulating nested pairs to cooperate with the indexing pins 178 and apply sufficient inward pressure against the nested pairs to keep them in a unitary bundle.

Figure 13:
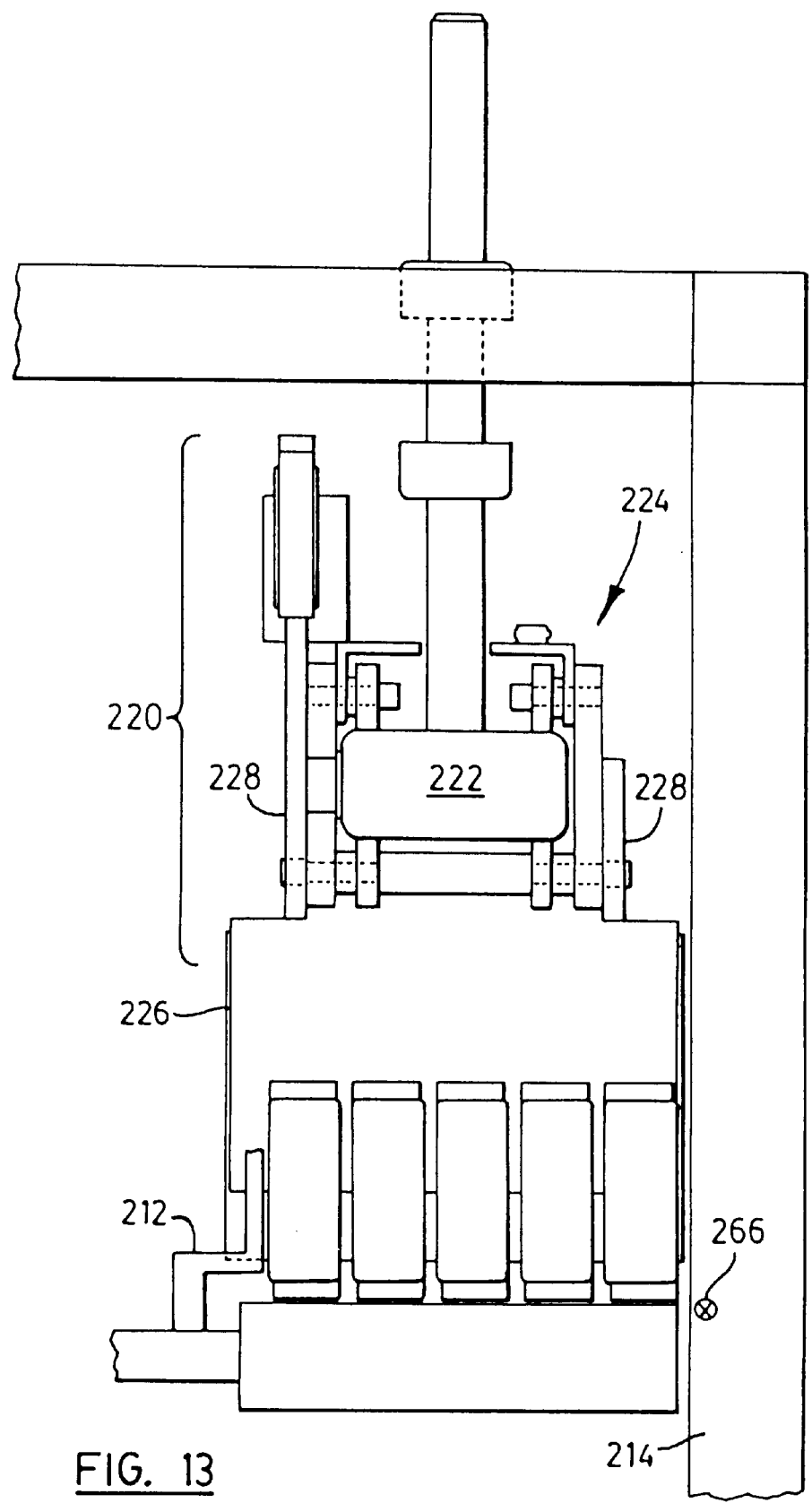
FIG. 13 is a magnified end view of still another portion of the installation as shown in FIG. 2.

Also provided in the bundling station 18 is an elevator assembly 200 to elevate the accumulated bundle of nested pairs from the receiving area 176 of the bundling bed 174. The elevator assembly 200 includes a support beam 202 which is movable, under the action of a linear actuator 204, from a first lower elevation corresponding to the elevation of the receiving area 176 of the bundling bed 174, as shown in FIG. 12, to a second upper elevation, as shown in FIG. 13, for later dispatch to the downstream strapping station. Pivoted to the support beam 202 are a number of rollers 206 which are positioned to fit between adjacent frame members making up the bundling bed 174. A pivot assembly 208 is provided on the support beam 202 to pivot the rollers 206 from an operable position extending generally parallel to the frame members and into the receiving area 176, as shown in FIG. 12, and an inoperable position swung outwardly from the receiving area 176, as shown in dashed lines in FIG. 3b.

Located generally perpendicular to the frame members and upwardly projecting from the support beam 202 on left hand side of the receiving area 176 are a number of fixed guide pins 212 which are positioned to engage the left most face of the accumulated bundle of nested pairs as their number reaches a predetermined value, such for example five as mentioned above. A number of guide members 214 are provided on the right hand side of the receiving area 176 and are positioned to engage the right most face of the accumulated bundle of nested pairs as their number reaches the predetermined value. The guide pins 212 and the guide bars cooperate to maintain the accumulated nested pairs in a unitary bundle during their elevation from the receiving area 176 to the second upper elevation.

Figure 4A:
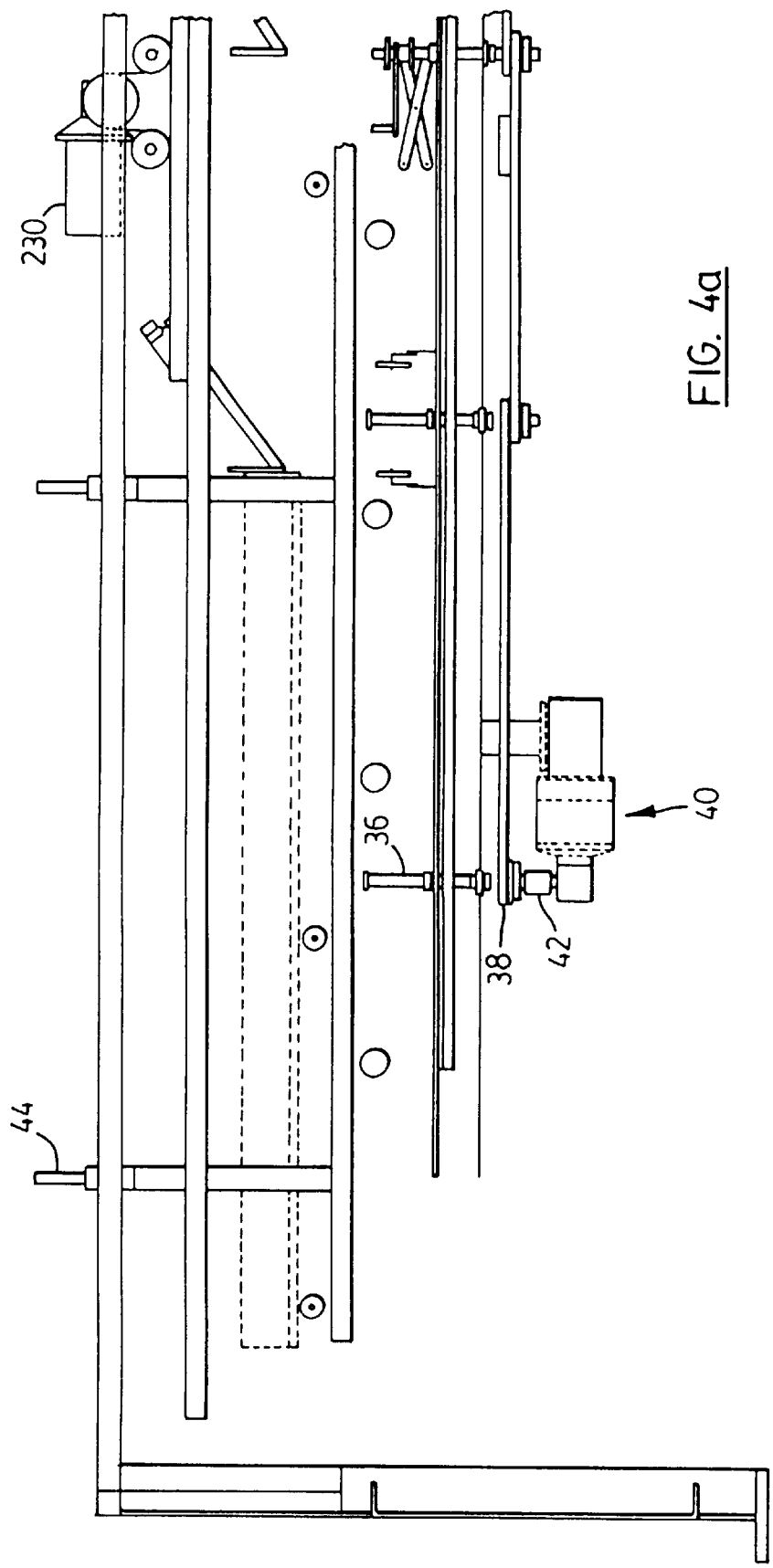
Figure 4B:
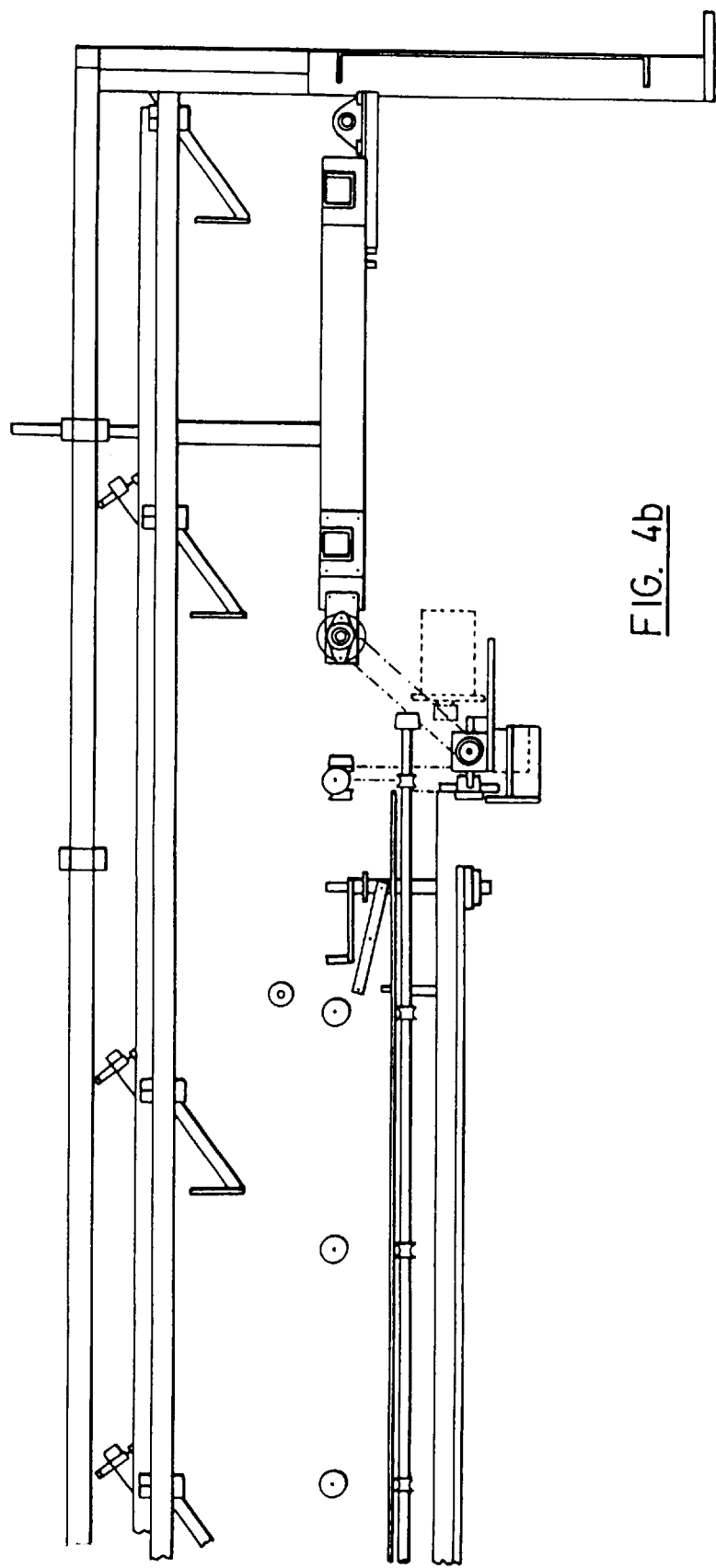
FIG. 4b is a fragmentary side view of the right hand segment FIG. 3b.

Referring to FIGS. 4a, 4b and 13, a dispatch unit 220 is provided at the second upper position to dispatch the accumulated bundle of nested pairs to the downstream strapping station, not shown. The dispatch unit 220 includes a central track beam 222 suspended from a frame structure and a dispatch truck rollably engaged with the track beam. A number of aligning plates are positioned in upright fashion below the dispatch truck 226, each by way of a pair of pivot bars 228. Each aligning plate is arranged to engage the end face of the accumulated pairs. A chain drive unit 230 has a motor driving a chain which is coupled to the truck to for displacement along the track beam, thereby to displace the bundle of accumulated nested pairs, against the rollers 206 and toward the downstream strapping station.

Figure 15:
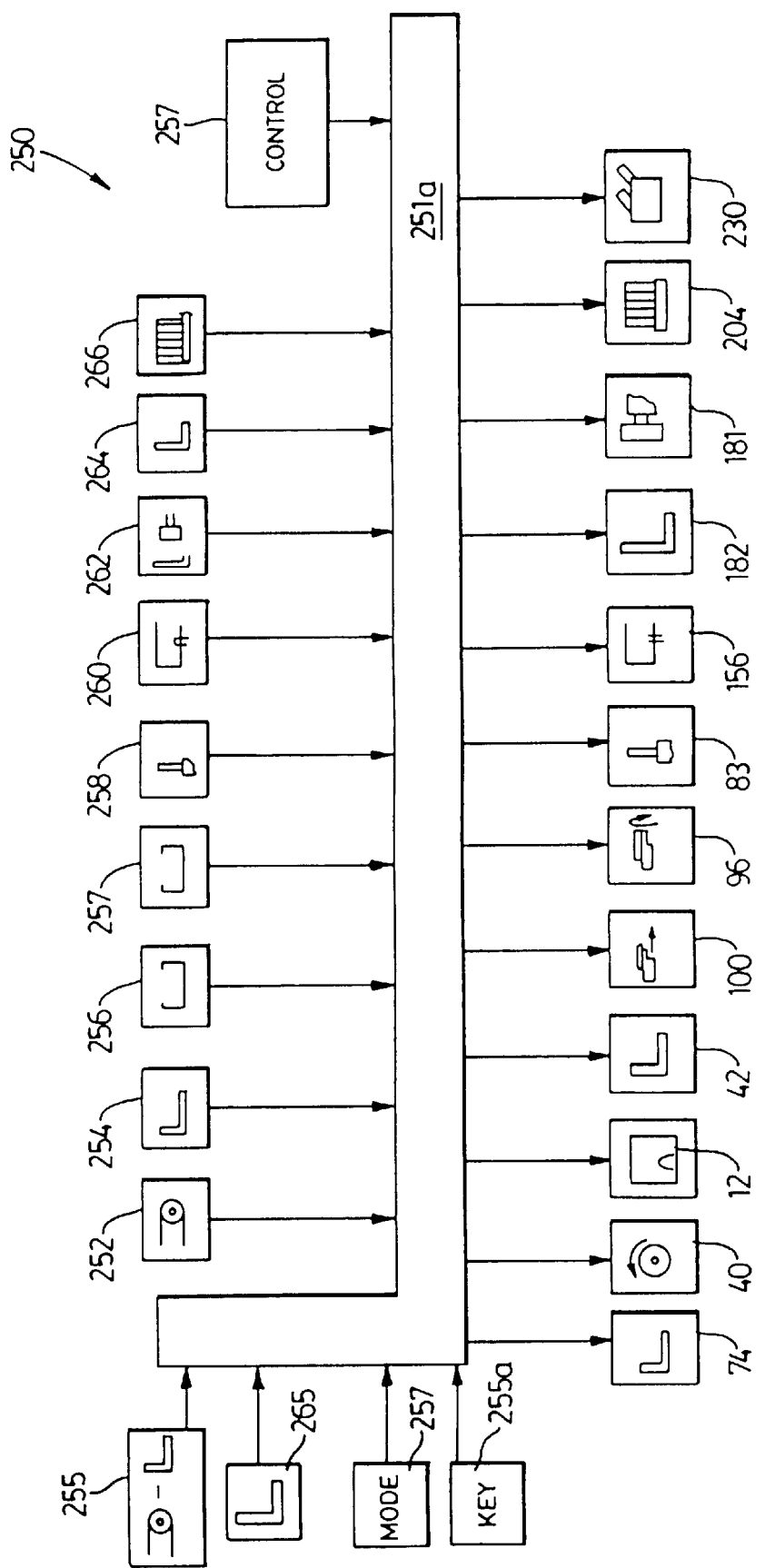
FIG. 15 is a schematic view of a control portion of the installation of FIG. 1.

Referring to FIG. 15, also provided is a controller 250 for controlling the functions of the installation. The controller 250 includes a control circuit 251, a number of sensors to sense the completion of certain steps during the process, as well as a number of counters and switches to actuate the linear actuators, which are in communication with one another by way of a common bus 251a. Referring as well to FIGS. 3a, 3b, an overhead optical conveyor sensor 252 is located near the end of the conveyor belt 24 to detect the leading end of an incoming channel member. A proximity switch 254 is located at the end of the travel of the kicking arms 34 to end the kicking cycle. A safety feature may be provided in the controller 250 to interrupt the forming station 12 if too many channel members are present on the transport station 14 without the kicking arms 34 operating. In this case, a counter 255 increments every time the forming station 12 implements a shearing operation and decrements every time a kicking cycle is completed. The counter limit may then be adjusted when the length of the channel members to be formed is changed.

The controller is further provided with a key entry unit 255 so that the operator can enter system parameters into the controller 250 as will be described.

The controller 250 is further provided with a mode selector 257 to provide the clutch/brake unit 42 with several modes of operation, including:

a. a NORMAL mode wherein the kicking arms 34 transfer one channel member at a time toward the nesting station 16;
b. an INSPECT mode wherein the kicking arms 34 transport a current channel member toward the nesting station 16 and transports a subsequent channel member toward the inspection station 20;
c. a REJECT mode wherein the kicking arms 34 transport the incoming channel members to the inspection station 20 until a mode selector 257 is returned back to the NORMAL mode;

Four sensors 256, 257, preferably part-in-place sensors, including two pairs each arranged in parallel, and are mounted adjacent the barrier pins 80 to detect the first and second channel members.

A pair of sensors part-in-place sensors 258, wired in parallel, are mounted above the nesting bed 60 detect the passage of the nested pair into the exit region. A part-in-place sensor 260 is also mounted in the mouth of the yoke 142 to detect the presence of a nested pair against the stop member 148. A part-in-place sensor 262 is also mounted adjacent the delivery area of the bundling station 18 to detect the presence of the nested pair in the delivery area.

A part-in-place sensor 264 is mounted on a frame member adjacent the bundling bed to detect the retraction of one of the indexing pins 178. A counter 265 is also provided to count the number of times the indexing pin is retracted so as to trigger an elevation sequence when the accumulated bundle number equals the predetermined number.

An elevator sensor 266 is provided to sense the presence of the accumulated bundle in the second upper elevation, so as to trigger the dispatch of the accumulated bundle to the downstream strapping station.

In use, the common drive unit 74 and the kicking drive motor 40 are both actuated by the controller 250 causing both the rollers 26 and the belt members 62 to be activated by their respective drive shafts, as well as the kicking arms 34 to be in their ready position with the clutch/brake unit 42 in its disengaged position. The conveyor and rollers 26 are operated at a rate to provide the incoming channel members with a faster speed than the speed at which they exit the forming station 12, for example 50 feet per minute faster.

The operator first enters into the controller 250, by way of the key entry 255, the system parameters length of the channel members and the controller 250 determines which of the third or fourth kicking arms 34 need to be actuated to their operational position. In this case, the corresponding solenoid may be operated to displace the arm. Should the displacement be upward, the sleeve 50 is in turn displaced downwardly, thereby lowering the kicking arm which is fixed to its upper end and thus the elevation of the remote end. In this lower position, the remote end is thus below the elevation of the plane. In this position, then, the kicking arm will pass beneath the channel members when they are actuated. This is advantageous because the first and second kicking arms 34 can transport a relatively short channel member to the nesting station 16 while the third and fourth kicking arms 34 in their inoperative positions, will not interfere with the oncoming channel members during their kicking stroke.

For example, the first and second kicking arms 34 might be required for channel members up to eight feet in diameter, while the third and fourth kicking arms 34 might be necessary for channel members 12, 16 20 feet in length respectively. The operator then enters into the controller 250 the width of the channel members and the controller 250 determines the appropriate position of the coupler unit 90. For example, if the channel members are 2 inches in width, the coupler unit 90 may be already in its proper position. However, if the channel members are 10 inches in width, the bearing assembly may be displaced along the track member 98 until the coupler unit 90 is centrally positioned relative to the channel member.

The forming station 12 is then instructed by the controller 250 to begin sending channel members one-by-one to the transport station 14. When a first channel member is detected by the overhead optical conveyor sensor 252, and the mode selector 257 is in NORMAL mode, the controller 250 conveys a signal to the clutch/brake unit 42 to kick the channel member laterally in the direction of the nesting bed 60. When the INSPECT mode is selected, for example to inspect an incoming channel member, the kicking arms 34 transport the current channel member to the nesting station 16 and the incoming channel member to the inspection station 20. This occurs because the kicking arms 34 are stopped after 180 degrees during their current sequence, then operate for the remaining 180 degrees of their circular path on the next sequence. The kicking sequence is reset to the NORMAL mode after transporting the one incoming channel member only. In the REJECT mode, the channel members are transported by the kicking arms 34 to the inspection station 20 until the selector is returned to the NORMAL mode. Again, the rejection of an incoming channel member only occurs after the current channel member has been transported to the nesting station 16.

The channel members leave the transport station 14 in a diagonal direction, that is with a longitudinal velocity in the direction of the longitudinal path along the transport station and a lateral velocity in the direction toward the nesting bed. Preferably, the channel members have a lateral velocity which is greater than that of the belt members. As a result, the channel members engage the belt members 62 of the nesting station 16 travelling diagonally toward the barrier pins 80 and immediately decelerate.

Figure 10A:
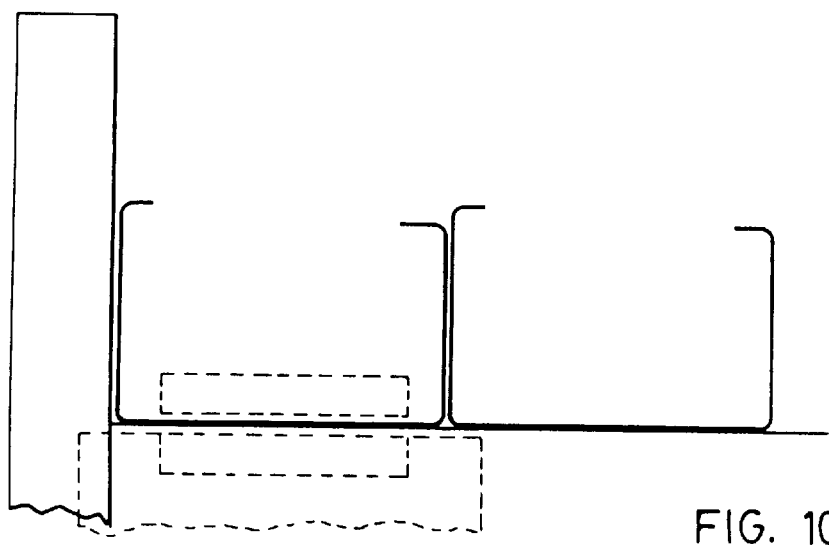

The speed of the channel members is such that the first channel member abuts the barrier pins to reach its first ready position. Likewise, the second channel member reaches its second ready position when its second near end abuts the first near end. With the channel members in place, the coupler unit 90 moves from its disengaged position to its engaged position, thereby to approach the first channel member and the lips to engage the central portion of the first channel member. The reciprocating member rotates the track member 98 and thus the first channel from the ready position as shown in FIG. 10*a* to the inverted position as shown in FIG. 10*e*.

As the first channel proceeds through its movement, the second channel member's position relative to the barrier changes in response. Since the belt members 62 continue to travel toward the barrier and the friction between the lower surface of the second channel members and the belt the second channel member biases the latter against the first channel member, and likewise the first channel member against the barrier.

Figure 10B:
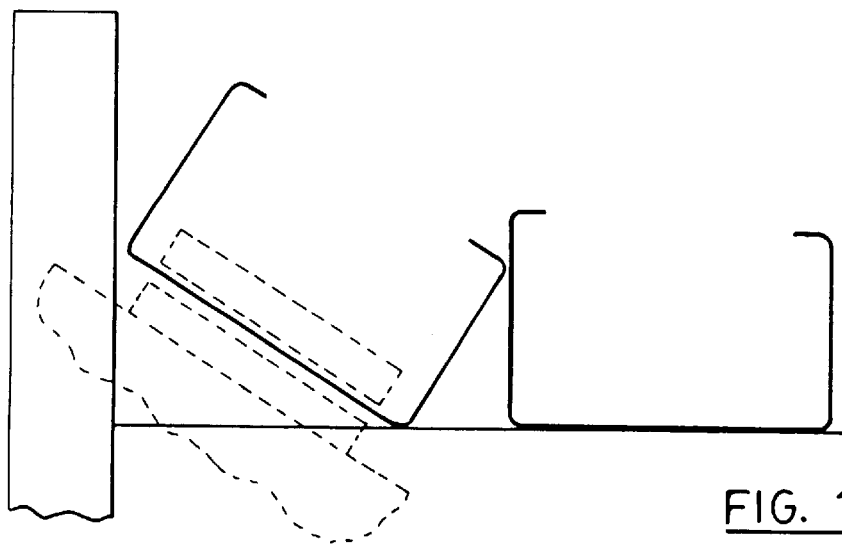
Figure 10C:
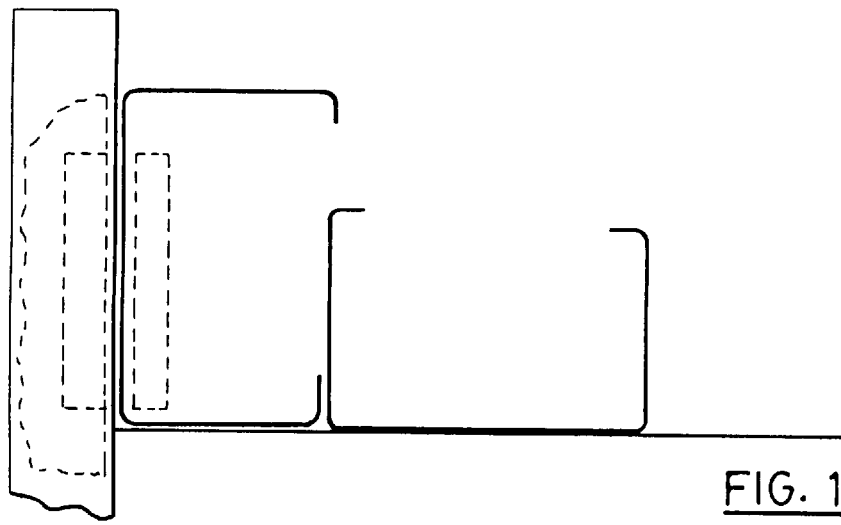
Figure 10D:
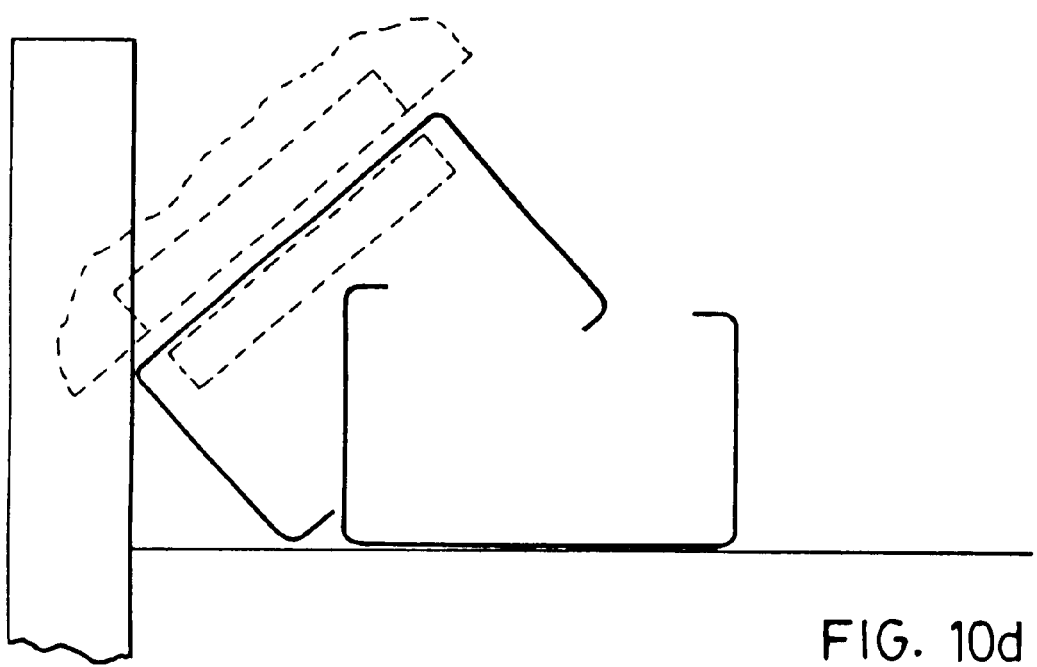
Figure 10E:
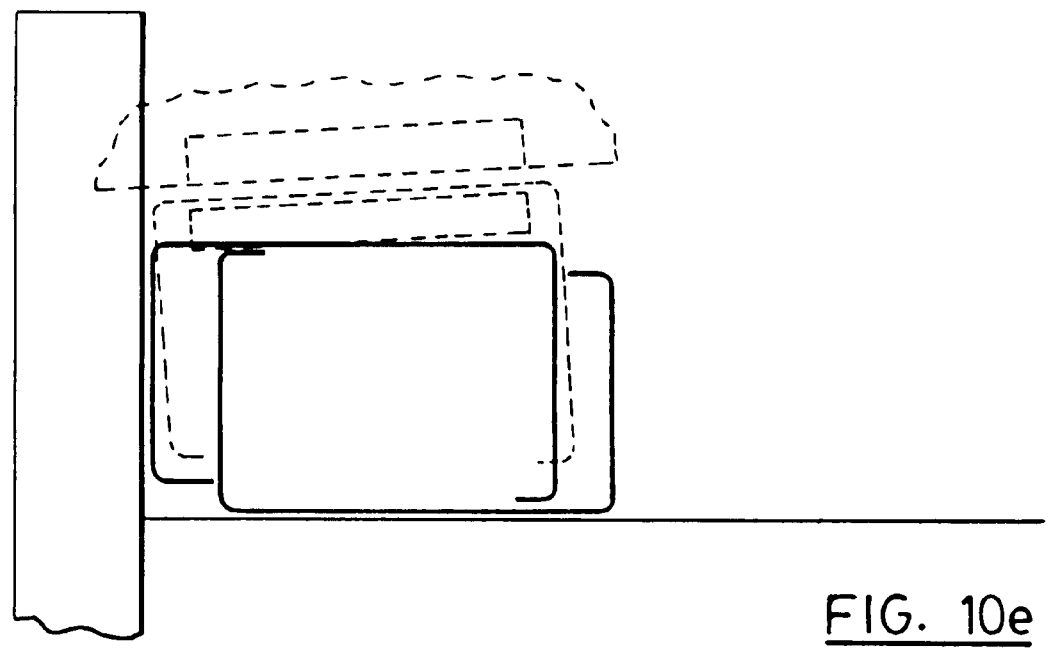
Figure 11:
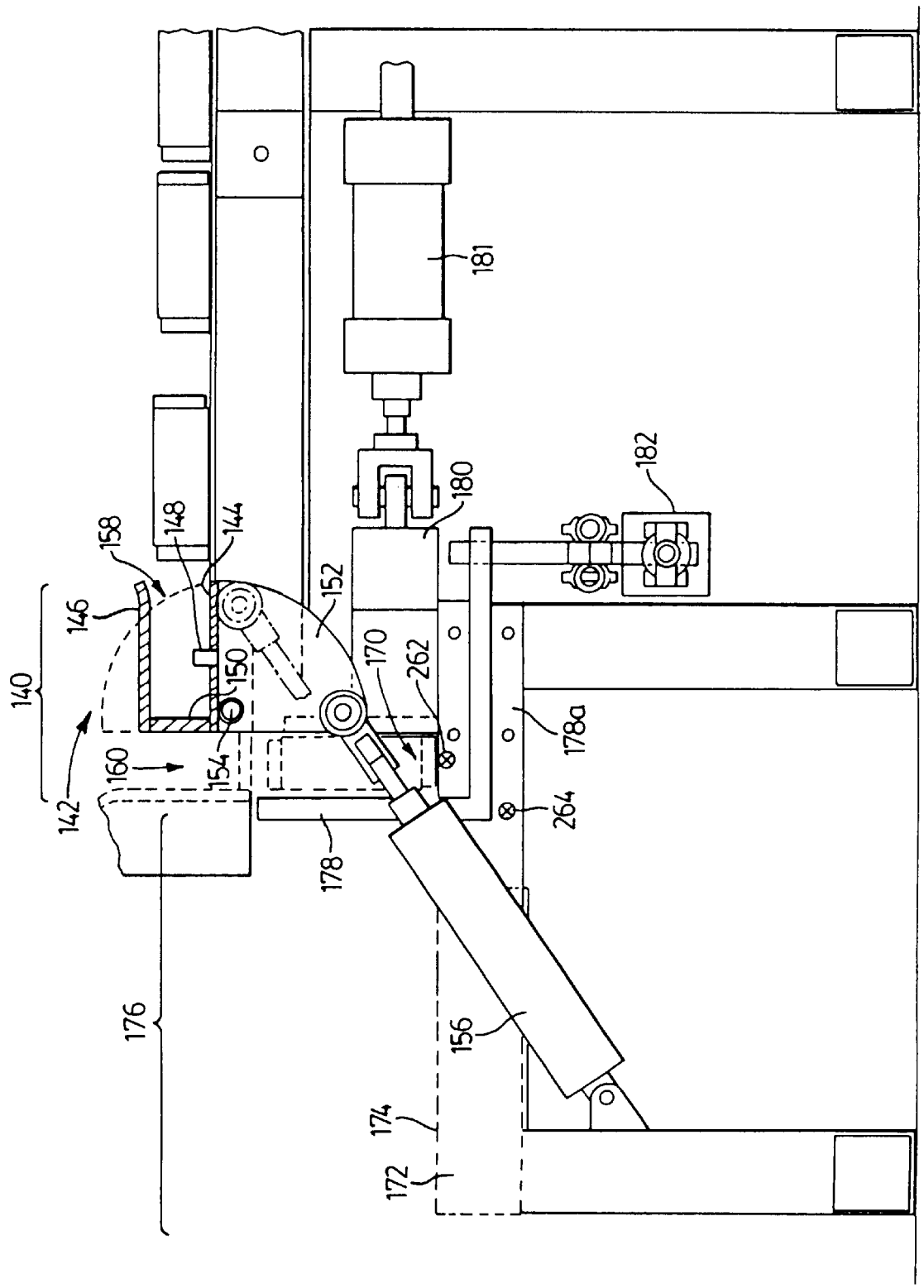
FIG. 11 is a magnified end view of another portion of the installation as shown in FIG. 2.

As the first channel member begins to rotate as shown in FIG. 10*b*, its right side wall causes a slight right hand shift of the second channel member. However, the first channel member shifts to the left as it passes through a position with the right hand side wall now lying against the nesting bed 60 as shown in FIG. 10*c*. The second channel member follows suit and has now shifted to the left toward the barrier. The upper lip of the now horizontal left side wall is at an elevation above the corresponding left side wall of the second channel member. As the first channel member proceeds to the position shown in FIG. 10*d*, the left side wall of the first channel member partially extends inside the area between the side walls of the second channel member. As the first channel member reaches its inverted position, its left hand side wall is now fully between the side walls of the second channel member, thus resulting in a staggered relationship between the now nested first and second channel members. Thus, the rotator unit 96 rotates the coupler unit 90 which in turn rotates the first channel member.

Figure 14:
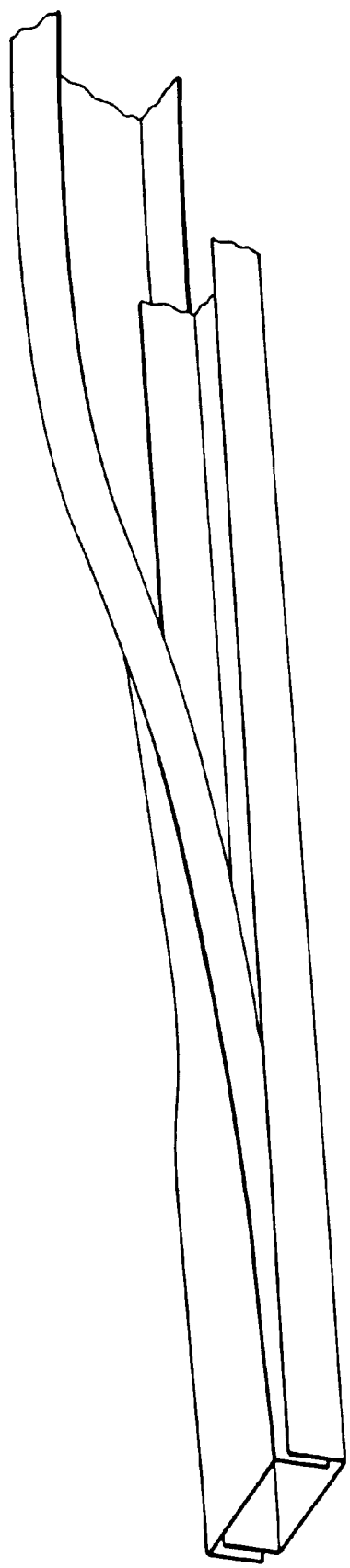
FIG. 14 is a fragmentary perspective view of a pair of channel members in a nesting sequence.

Meanwhile, the second channel member is manipulated downstream of its second near end portions, to allow the nesting of the articles to continue beyond the first and second near end portions. This manipulating step is, in this case, provided by the biasing force caused by the belt members against the second member which causes the second channel member to press against the first channel member. Given the length of the channel members, there may be significant torsional resiliency along their length. The nesting effect may then first be seen at the near end of the first and second channel members as they are nested together during the rotation sequence. The nesting effect may then be seen by a very rapid nesting of the torsionally flexing sections of the channel members along their length, similar to the closing of a zipper, as aided by the biasing force of the belt members 62 as shown in FIG. 14. Thus, the biasing force generated by the belt members cooperate to manipulate the second channel member so that it will be in a suitable receptive position for the approaching first channel member.

As soon as the rotator unit 96 has completed its full travel, the coupler unit 90 is retraced to is disengaged position and the rotator unit 96 returns to its home position. It may be, however, that the rotator unit need not rotate to the fully nested position as showing in FIG. 10*e*. Instead, the rotator unit may need only rotate to the position shown in FIG. 10*e* where there force of the belts and the torsional resiliency may be capable of continuing nesting along the remaining length of the articles.

With the channel members now clear of the coupler unit 90, the controller conveys a signal to the solenoids 83 to lower the barrier pins 80 to allow the nested pair to travel to the exit region of the nesting bed 60 and thereby to approach the yoke 142. After the part-in-place sensors mounted above the nesting bed 60 detect the passage of the nested pair into the exit region and the controller 250 conveys a signal to activate the barrier pins 80 to their operative position. The nested pair then approaches and abuts the stop member 148, where the part-in-place sensor detects their presence and the controller 250 then conveys a signal to the linear actuator 156 to activate the yoke 142 to its second vertical position to deliver the nested pair to the delivery area. As soon as the delivered nested pair is detected in the delivery area, the controller 250 conveys a signal to return the yoke 142 to its first horizontal position to receive an upcoming nested pair.

At this point, the controller 250 conveys signals: to the linear actuator 182 to drop the starter pin, to the linear actuator advance the indexing beam 180 to shift the nested pair into the receiving area 176 and into engagement with the keeper pins 184 opposite thereto, to raise the indexing pins 178 and thereafter to retract the indexing beam 180. The nested pair is then held between the keeper pins 184 on the left hand side and the indexing pins 178 on the right. This bundling sequence is continued until the predetermined number of nested pairs in the accumulated bundle is obtained. At that point, the width of the accumulated bundles is such that the left hand side of the bundle is now engaging the fixed guide pins 212 and the right hand side is aligned with the guide bars. At this stage, the counter registers that the predetermined number has been reached and the controller 250 conveys a signal to raise the elevator assembly 200 to the second upper elevation.

The elevator sensor senses the presence of a accumulated bundle in the second upper elevation, the controller 250 conveys a signal to activate the dispatch truck which approaches the bundle.

One by one, the nested pairs are accumulated in the receiving area 176 until a predetermined number, for example five, are accumulated. The keeper pins 184 are movable across the receiving area 176 in order to maintain are transferred toward the far end of the receiving area 176 as the width of the package of accumulated nested pairs widens with continuing addition of nested pairs.

As soon as the location sensors sense the presence of the five nested pairs in the receiving area 176, linear actuator lifts the support beam 202, and in turn the rollers and the accumulated five nested pairs, from the first lower elevation to the second upper elevation.

The successive aligning plates are pivoted in such a manner that those which are not upstream of the remote end of the bundle will pivot upwardly as they abut with the approaching top surface of the bundle. The aligning plates are positioned so that the nearest upstream aligning plate, which does not abut the top surface of the bundle, is in line with the rear end face of the bundle. The chain drive unit 230 then displaces the truck until the nearest upstream aligning plate engages the rear end face of the bundle and then continues to displaces the truck, and thereby the accumulated pairs, against the rollers and in the direction of the beam to the downstream strapping station.

With the bundle safely dispatched to the downstream strapping station, the pivot drive assembly collectively pivots the rollers from the operable position to the inoperable position swung outwardly from the receiving area 176. The support beam 202 is then lowered to the first lower elevation and the pivot drive assembly collectively pivots the rollers, this time back to their operable position generally parallel with the frame members.

It will be recognized that the sensors may be one or more of a number of types of well known sensors, such as infrared, photosensors, mechanical sensors and the like. Likewise, the linear actuators may be hydraulic, pneumatic, electric and the like.

What is claimed is:

1. A method of nesting a pair of elongate articles, each having a complementary nesting surface, comprising the steps of:

providing an article receiving surface;

delivering a first elongate article to a first ready position on said article receiving surface; said first article having a first near end portion and a first far end portion;

delivering a second elongate article to said article receiving surface; the second article having a second near end portion and a second far end portion;

arranging said second article so that said second near end portion lies in a second ready position adjacent said first near end portion;

engaging said near end portion of one of said articles independently of the far end portion thereof;

transferring said engaged near end portion relative to the other of said near end portions to initiate nesting thereof; and manipulating at least one of said articles downstream of said first and second near end portions, to allow the nesting of said articles to continue beyond said first and second near end portions.

2. A method as defined in claim 1 wherein said transferring step includes the step of:

rotating said engaged near end portion about an axis.

3. A method as defined in claim 2 wherein said manipulating step includes the step of:

delivering said second far end portion to within a predetermined distance from said first far end portion.

4. A method as defined in claim 2 wherein said manipulating step includes the step of delivering a predetermined force to at least one of said articles.

5. A method as defined in claim 4 wherein said step of delivering a predetermined force includes the step of;

providing at least one biasing member for biasing said second article toward said first article.

6. A method as defined in claim 5 wherein said step of providing at least one biasing member includes the steps of:

providing a number of belt members; and powering said belt members to frictionally engage said second article.

7. A method as defined in claim 6 wherein said step of providing at least one biasing member includes the step of:

positioning said belt members on said surface to receive both of said articles thereon.

8. A method as defined in claim 4 wherein said manipulating step includes the step of delivering a progressive force along the length of at least one of said articles.

9. A method as defined in claim 8 wherein said step of delivering a progressive force includes the step of progressively pressing said first article into nesting engagement with said second article.

10. A method as defined in claim 8 wherein said step of delivering a progressive force includes the steps of:

providing said engaged article with a torsional resiliency sufficient to twist said engaged article during said transferring step, thereby to initiate nesting of said near end portions while said far end portions remain unnested.

11. A method as defined in claim 10 wherein said transferring step includes the step of:

establishing a point of contact between one formation on said first article with one adjacent formation on said second article as said nesting is initiated.

12. A method as defined in claim 11 wherein said manipulating step includes steps of;

delivering a force to said first and second articles to cause said point of contact to travel toward said near end portions.

13. A method as defined in claim 12 wherein said first article is rotated relative to said second article.

14. A method as defined in claim 13 wherein said first and second articles are channel members, each having a pair of side wall portions extending outwardly from a central portion.

15. A method as defined in claim 14 wherein said second near end portion abuts said first near end portion in said second ready position.

16. A method as defined in claim 15 wherein said manipulating step occurs prior to said transferring step.

17. A device for nesting a first article and a second article, each having a nesting surface and a number of formations extending outwardly therefrom, said first article having a first near end portion and a first far end portion and said second article having a second near end portion and a second far end portion, comprising:

an article receiving surface;

means for delivering said first and second articles to said article receiving surface with said first near end portion at a first ready position and said second near end portion located at a second ready position adjacent said first near end portion;

engaging means for engaging the near end portion of one of said articles independently of the far end portion thereof;

transfer means operable with said engaging means for transferring said engaged near end portion relative to the other of said near end portions. thereby to initiate nesting of said engaged near end portion with said other near end portion, wherein said transferring means includes rotating means for rotating said engaged near end portion about an axis; and manipulating means for manipulating at least one of said articles downstream of said first and second near end portions, to allow nesting of said articles to continue beyond said first and second near end portions.

18. A device as defined in claim 17 wherein said transferring means includes rotating means for rotating said engaged end portion about an axis.

19. A device as defined in claim 17 wherein said delivery means cooperates with said manipulating means to deliver said second far end portion to within a predetermined distance from said first far end portion.

20. A device as defined in claim 19 wherein said manipulating means includes a biasing arrangement for biasing said second article toward said first article.

21. A device as defined in claim 20 wherein said biasing arrangement includes a number of belt members, said belt members being arranged to frictionally engage said second article.

22. A device as defined in claim 21 wherein said second near end portion is arranged to abut said first near end portion in said ready position.

23. A device as defined in claim 19 wherein said manipulating means is further arranged to deliver a progressive force along the length of said first and second articles.

24. A device as defined in claim 23 wherein manipulating means includes press means for progressively pressing said first article into nesting engagement with said second article.

25. A method of nesting a pair of elongate articles, each article having a near end portion, a far end portion and a nesting surface which is complementary to the nesting surface of the other article, the method comprising the steps of:

providing an article receiving surface;

delivering the articles side by side on said article receiving surface;

engaging a near end portion of one of said articles independently of the far end portion thereof;

transferring said engaged near end portion relative to the other of said near end portions to initiate nesting thereof; and manipulating at least one of said articles downstream of said near end portions, to allow the nesting of said articles to continue beyond said first and second near end portions.

26. A method as defined in claim 25 wherein, in the delivering step, the articles are successively delivered to the article receiving surface.

27. A method as defined in claim 25 wherein the articles are not substantially identical.

28. A method of nesting a pair of elongate articles, each of having a near end portion, a far end portion and a nesting surface which is complementary to the nesting surface of the other article, the method comprising:

a step for providing an article receiving surface;

a step for delivering the articles side by side on said article receiving surface;

a step for engaging a near end portion of one of said articles independently of the far end portion thereof;

a step for transferring said engaged near end portion relative to the other of said near end portions to initiate nesting thereof; and a step for manipulating at least one of said articles downstream of said near end portions, to allow the nesting of said articles to continue beyond said first and second near end portions.

29. A method of nesting a pair of elongate articles, each article having a near end portion, a far end portion and a nesting surface which is complementary to the nesting surface of the other article, the method comprising the steps of:

providing an article receiving surface;

delivering the articles side by side on said article receiving surface;

engaging a near end portion of one of said articles independently of the far end portion thereof;

manipulating at least one of said articles downstream of said near end portions; and transferring said engaged near end portion relative to the other of said near end portions to initiate nesting thereof.

30. A method as defined in claim 29 wherein the manipulating step includes the step of biasing one of the articles toward the other.

* * * * *